(12) United States Patent
Honma

(10) Patent No.: US 6,476,933 B1
(45) Date of Patent: Nov. 5, 2002

(54) IMAGE STORING APPARATUS WITH IMAGE QUALITY CONVERSION FEATURE

(75) Inventor: Masayuki Honma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/221,872

(22) Filed: Dec. 29, 1998

(30) Foreign Application Priority Data

Jan. 12, 1998 (JP) .............................. 10-003989

(51) Int. Cl.[7] ............................ G06K 15/00; G06K 9/36
(52) U.S. Cl. ........................................ 358/1.9; 382/298
(58) Field of Search ..................... 358/404, 444, 358/445, 451, 1.9; 382/299, 170, 298

(56) References Cited

U.S. PATENT DOCUMENTS 5,880,728 A * 3/1999 Kamaashi ................ 345/343
6,219,454 B1 * 4/2001 Kawano et al. ......... 382/232

FOREIGN PATENT DOCUMENTS

| JP | 401278169 | * 11/1989 | ............ H04N/1/21 |
| JP | 06291987 | * 10/1994 | .......... H04N/1/387 |
| JP | 406291987 | * 10/1994 | .......... H04N/1/387 |
| JP | 411184879 | * 7/1999 | ............ G06F/17/30 |

* cited by examiner

Primary Examiner—Jerome Grant, II
(74) Attorney, Agent, or Firm—Fitzpatrick, Cella, Harper & Scinto

(57) ABSTRACT

In order to effectively use personal boxes provided to a photocopier apparatus, the control unit of the photocopier stores image data output from a host computer in personal boxes, and the image quality of the image data stored in the personal boxes is converted according to attributes information of the image data.

40 Claims, 21 Drawing Sheets

IMAGE STORING APPARATUS WITH IMAGE QUALITY CONVERSION FEATURE

BACKGROUND OF THE INVENTION

1. Field of the Invention

The present invention relates to an image storing apparatus having storing means for storing image data.

2. Description of the Related Art

There are known digital photocopiers which have large-capacity hard disk (HD) drives. Such large-capacity hard disk drives are mainly used for executing electronic sorting functions.

Electronic sorting functions consist of repetitively performing the actions of: reading an image of the original to be photocopied, storing the image data in a hard disk, and reading out this image data, thereby printing the photocopy. Such an arrangement allows for outputting the copies in sorted order without having a sorter device with a plurality of bins. Also, as such, an arrangement can be made wherein the digital photocopier receives PDL (Page Description Language) data from a host computer via a network, renders the PDL into bit-mapped image data, temporarily stores the image data on the hard disk in the same manner as described above, and prints copies by reading the image data from the memory.

Recently an arrangement has been proposed wherein the storage area of the hard disk is separated into sections, each for personal use, the image data received from the host computer is temporarily stored in the area (personal box) specified by the host computer, and the image is printed from the image data stored in the personal box. The image data stored in the personal box is printed by a user entering a password from the operating unit of the photocopier to access the storage area allocated to himself/herself. Accordingly, the image data stored in the personal box of the owner thereof cannot be accessed by others, so there is no danger of the image data being accessed by others.

However, since the host computer can specify any personal box and send image data there, image data from various users is stored in the personal box.

Accordingly, the personal box easily becomes full, and in the event that the personal box becomes full, there is the problem that the personal box cannot be used in that state.

SUMMARY OF THE INVENTION

It is an object of the present invention to provide an image storing apparatus which solves the above problems.

It is another object of the present invention to provide an image storing apparatus which enables effective use of the personal boxes.

These and other objects, features, and advantages of the present invention will become more fully apparent from the following detailed description of the preferred embodiments taken into connection with the drawings.

DESCRIPTION OF THE PREFERRED EMBODIMENTS

First Embodiment

Figure 1:
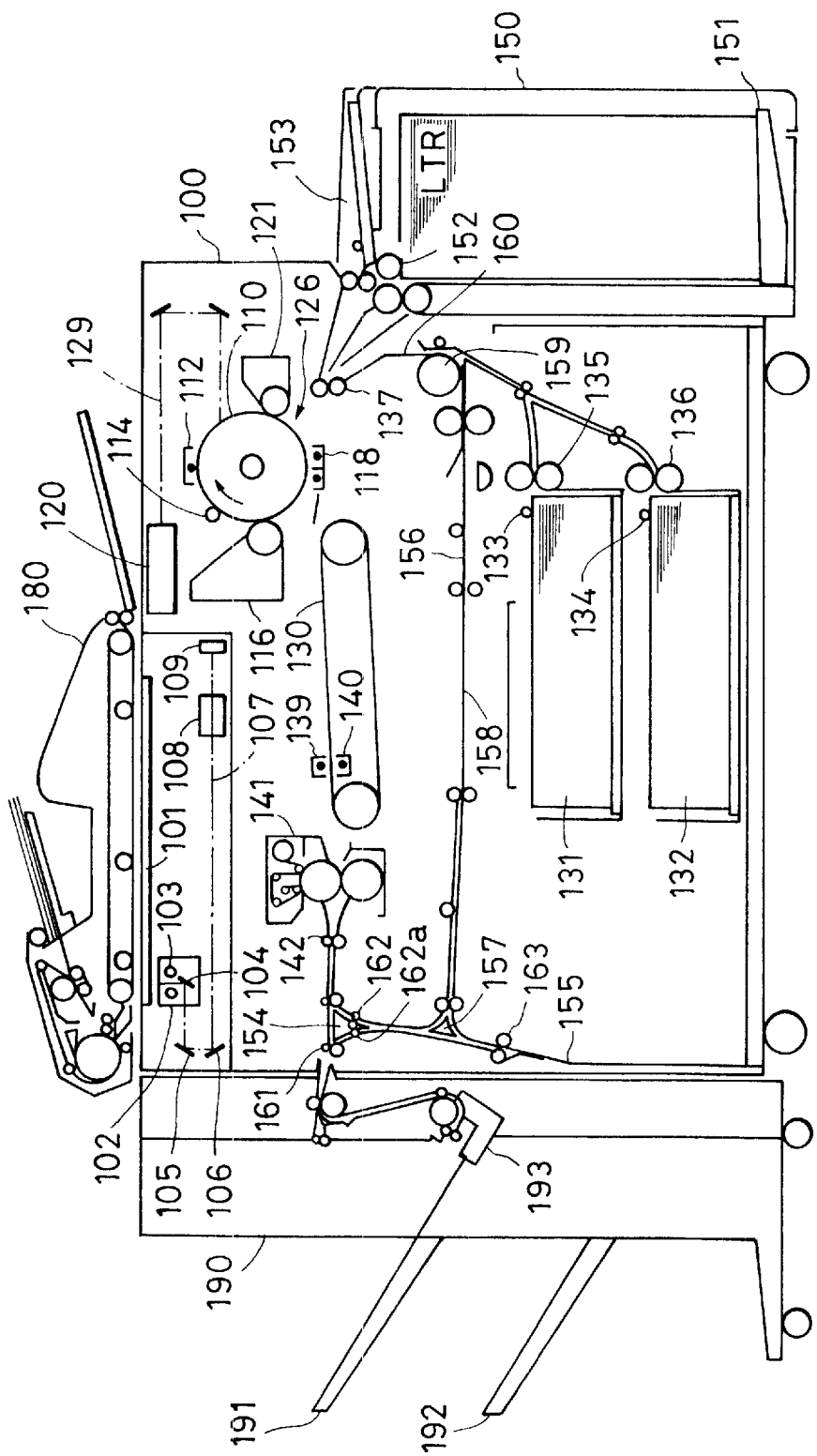
FIG. 1 is a cross-sectional view of a photocopier apparatus.

FIG. 1 is a cross-sectional diagram of an example of a photocopier apparatus according to present invention, wherein reference numeral 100 denotes the photocopier proper, and 180 denotes a recirculating document feeder (RDF).

In FIG. 1, reference numeral 101 denotes a platen glass serving as the original table, and reference numeral 102 denotes a scanner, comprised of a lamp 103 for illuminating the original and scanning mirror 104, among other components. The scanner is reciprocally moved in a certain direction by an unshown motor, and the reflected light 107 from the original on the platen glass 101 is imaged by the CCD sensor (image sensor unit) 109 via the scanning mirrors 104–106 and lens 108.

Reference numeral 120 denotes an exposure control unit comprised of a laser, polygon scanner, etc. The exposure control unit 120 irradiates a photosensitive drum 110 with a laser beam 129 which has been modulated based on image signals which have been converted into electrical signals by the image sensor unit 109 and subjected to certain image processing steps which will be described later.

Provided around the photosensitive drum 110 are a primary charger 112, developer 121, transfer charger 118, cleaning device 116, and pre-exposure lamp 114. At the image forming unit 126, the photosensitive drum 110 is rotated by an unshown motor in the direction shown by the arrow in the Figure. After the photosensitive drum 110 is charged with a certain potential by the primary charger 112, the laser beam 129 is irradiated from the exposure controlling unit 120, thereby forming a latent image. The latent image formed on the photosensitive drum 110 is developed by the developer 121, and visualized as a toner image. On the other hand, the transfer sheet which has been supplied from either the upper cassette 131 or the lower cassette 132 by means of the pick-up rollers 133 and 134 is transported to the main unit by means of the feeding rollers 135 and 136 and fed to the transfer belt 130 by the resist roller 137, thereby transferring the visualized toner image onto the transfer sheet by means of the transfer charger 118. The photosensitive drum 110 is cleaned of residual toner by the cleaner device 116, and the residual charge is removed by the aforementioned exposure lamp 114.

Following image transfer, the transfer sheet is separated from the transfer belt 130, the toner image is recharged by the pre-fixing chargers 139 and 140, and the transfer sheet is then sent to the fixer 141. The toner is fixed by the fixer 141 with the application of heat and pressure, and is dispensed from the main unit 100 by the ejecting roller 161.

The main unit 100 has a deck 150 which can load, for example, 4,000 sheets of transfer paper. The lifter 151 of the deck 150 rises according to the amount of transfer paper on the deck 150 so that the transfer sheets always are in contact with the feeding roller 152. Also provided is a multi-hand-feeder 153 which can load 100 sheets of transfer paper.

Further, in FIG. 1, reference numeral 154 denotes a paper ejecting flapper, which switches the path between the side of both-side recording or single-side recording and the side for paper ejecting. The transfer sheet sent out from the ejecting roller 142 is switched to either the side of both-side recording or the side of single-side recording. The lower transporting path 158 leads the transfer sheet sent out from the ejecting roller 142 to the refeeding tray 156. Reference numeral 159 denotes a feeding roller for feeding the transfer sheet to the side of the photosensitive drum 126 via the path 160. Reference numeral 161 denotes an ejecting roller which is placed near the ejecting flapper 154 and ejects the transfer sheet from the main unit 100, which has been switched toward the ejecting side by this ejecting flapper 154. In the event of recording on both sides of the sheet, the ejecting flapper 154 is raised upwards, and the recording sheet which has already been recorded on one side is stored in the refeeding tray 156, via the transporting paths 155 and 158.

When inverting the transfer sheet so as to eject the transfer sheet from the main unit, the ejecting flapper 154 is raised upwards, the multiple flapper 157 is laid over toward the right, the recording sheet which has already been recorded on is transported toward the transporting path 155, and after the trailing edge of the transfer sheet has passed the first feeding roller 162, the transfer sheet is transported toward the second feeding roller 162a by an inverting roller 163, and thus the transfer sheet is inverted and ejected from the main unit 100 by the ejecting roller 161.

Figure 2:
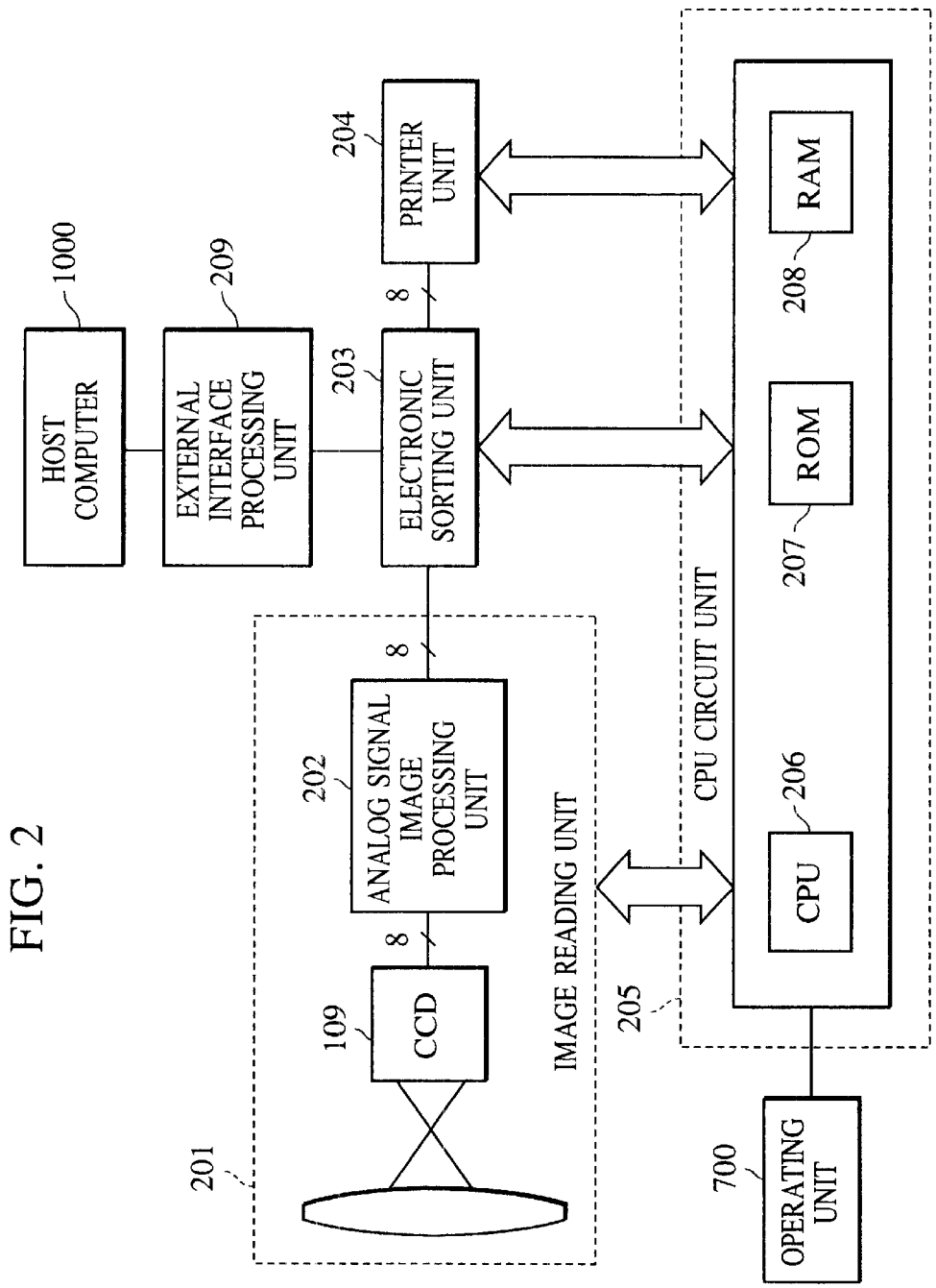
FIG. 2 is a block diagram of a photocopier apparatus.

FIG. 2 is a block diagram of a photocopier device according to an embodiment of the present invention. In FIG. 2, the image reading unit 201 is comprised of a CCD sensor 109, and analog signal image processing unit 202, etc., and the original image which is imaged on the CCD sensor 109 is converted into analog electrical signals by the CCD sensor 109. The converted image information is input to the analog signal image processing unit 202, and following sample & hold, and darkness level correction, etc., is subjected to analog/digital conversion (A/D conversion). The digitized image is subjected to shading correction (correction of irregularities in the sensor when reading the original, and correction of light distribution properties of the lamp for irradiating the original) and magnification variation, and is input to the electronic sorting unit 203.

At the electronic sorting unit 203, processing and working is conducted such as correction necessary for the output system such as γ correction, smoothing, edge clarification, and so forth, and then the image is output to the printer unit 204.

As described from the cross-sectional diagram shown in FIG. 1, the printer unit 204 is comprised of the exposure control unit 120 made up of a laser and so forth, the image forming unit 126, the transfer paper transporting control unit, etc., and records images on the transfer sheets from the input image signals.

Also, the CPU circuit unit 205 is comprised of a CPU 206, ROM 207, RAM 208, and so forth, and controls the image reading unit 201, electronic sorting unit 203, printer unit 204, and so forth, thereby centrally controlling the sequence control. Further, the CPU circuit unit 205 has a clock function which recognizes the present time. Instructions set at the operating unit 700 of the photocopier are input to the CPU circuit unit 205.

The external I/F processing unit 209 renders the PDL data output from the external host computer 1000 into bit-mapped image data, and outputs the bit-mapped image data to the electronic sorter unit 203 as image data.

Figure 3:
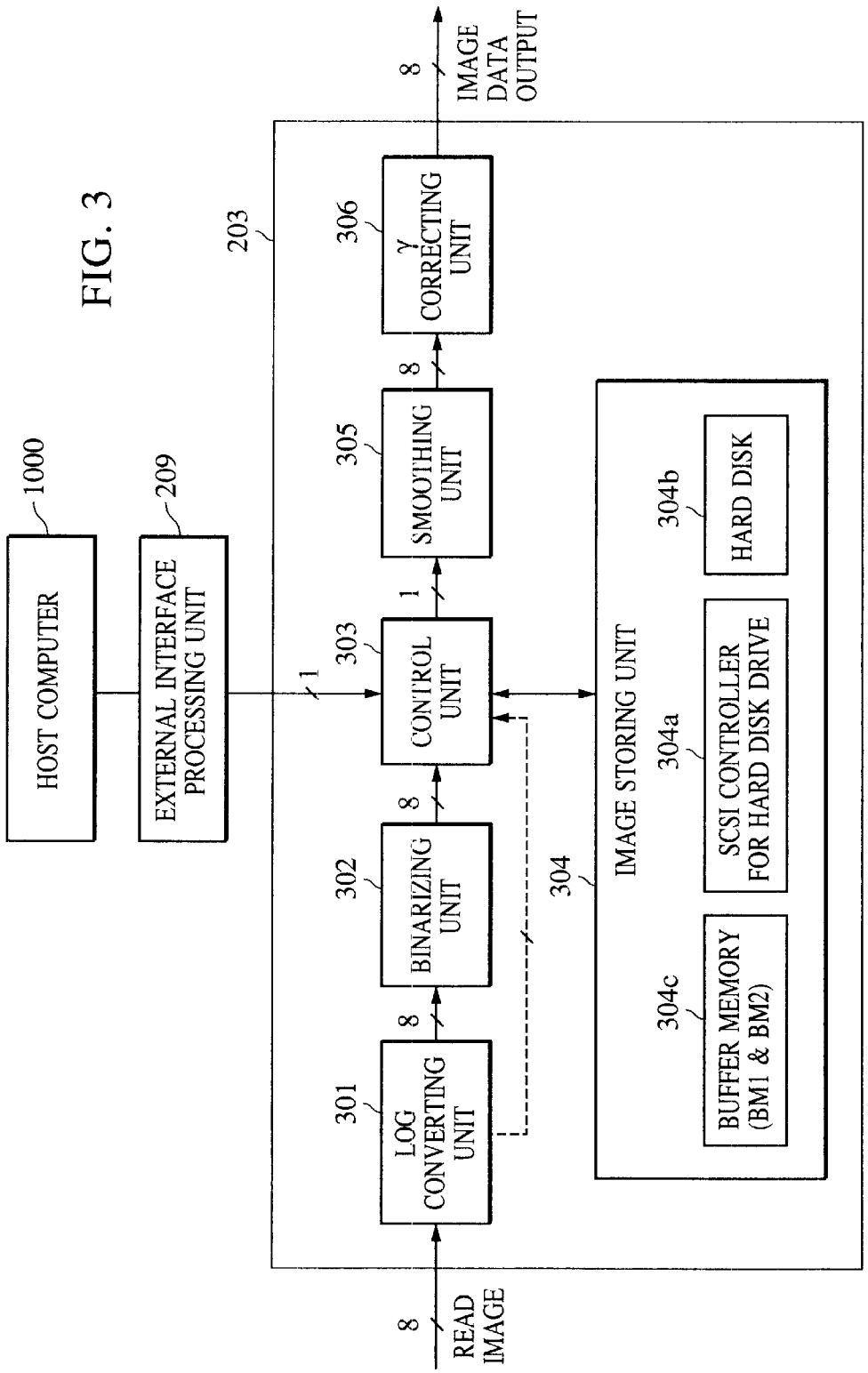
FIG. 3 is a block diagram illustrating the detailed configuration of an electronic sorting unit.

FIG. 3 is a block diagram illustrating the detailed configuration of the electronic sorting unit 203. Images sent from the image reading unit 201 are input as brightness data, and are sent to the log converting unit 301. A LUT (Look-Up Table) for converting the input brightness data into concentration data is stored in the log converting unit 301, and the brightness data is converted into concentration data by outputting table values corresponding with the input data.

Subsequently, the concentration data is sent to the binarizing unit 302. At the binarizing unit 302, multi-value concentration data is converted into either "0" or "255", and this 8-bit concentration data is converted into 1-bit binary data of either "0" or "1". Thus, the amount of image data stored in the memory is reduced.

The binarized image data is sent to the control unit 303. Also, the bit-mapped image data, rendered from the PDL data output from the host computer 1000 and input from the external I/F processing unit 209, has been processed as binary image data at the external I/F processing unit 209, and thus is sent to the control unit 303 as is.

At the control unit 303, based on instructions from the CPU circuit unit, original data read by the image reading unit 201 and bit-mapped image data from the external I/F processing unit 209 are all temporarily stored in the image storing unit 304 and the image data is sequentially read out and output from the image storing unit 304.

The image storing unit 304 has buffer memory 304c, a SCSI controller 304a, and a hard disk 304b, the binary image data sent from the control unit being temporarily stored in the buffer memory 304c. Then, based on instructions from the SCSI controller 304a, image data is written to the hard disk 304b from the buffer memory 304c. The buffer memory 304c is comprised of a buffer memory area 1 (BM1) and a buffer memory area 2 (BM2).

In the event of reading image data written to the hard disk 304b, the image data is first read from the hard disk 304b to the buffer memory 304c, and then the image data is sent from the buffer memory 304c to the control unit 303, based in instructions from the SCSI controller 304a.

The multiple pieces of image data stored on the hard disk 304b are printed in a sequence according to the editing mode specified at the operating unit of the photocopying device. For example, in the event that reversed printing and electronic sorting is to be performed to the PDL image data which is sent from the first page, all of the bit-mapped image data of the PLD pages sent from the host computer 1000 are temporarily stored in the hard disk 304*b*, the image data is read from the hard disk 304*b* beginning with the last page and leading up to the first page, and are printed in that order. Then, this is repeated for the number of copies requested from the host computer 1000, thus realizing electronic sorting.

Let us say that the buffer memory 304*c* is of a size that can store at least two pages at maximum resolution (e.g., 600 dpi) and maximum size (e.g., A3). This buffer memory 304*c* is used for reduction layouts such as 2-in-1 or 4-in-1. The already-reduced image data from the hard disk 304*b* is sequentially laid out in the buffer memory 304*c*, and following layout, the image data is sent to the control unit 303.

Further, the buffer memory 304*c* is used as a converting means for converting the resolution of the image data stored in the hard disk 304*b*. Converting the resolution of the image data stored in the hard disk 304*b* so as to reduce the amount of stored image data increases the amount of available capacity on the hard disk 304*b*, thereby facilitating effective use of the hard disk 304*b*.

For example, in the event of converting the resolution of the image data stored in the hard disk from 600 dpi to 300 dpi, the 600 dpi image data in the hard disk 304*b* is read out, and temporarily stored in the buffer memory area BM1 in the buffer memory 304*c*. The read image data is skipped for every other dot in the main scanning direction and for every other line in the sub-scanning direction, thereby creating 300 dpi data.

The created 300 dpi image data is written to the buffer memory area BM2 in the buffer memory 304*c*. This image data is written to the hard disk 304*b* once more. Upon storing the created image data to the hard disk 304*b*, the image data already on the hard disk 304*b* which corresponds to the created image data is written over.

Then, the 600 dpi image data in the buffer memory area BM1 and the 300 dpi image data in the buffer memory area BM2 are erased. Thus, the 600 dpi image data stored on the hard disk 304*b* can be converted into 300 dpi image data. Converting the image data resolution from 600 dpi to 300 dpi reduces the amount of data by one-fourth.

Also, by repeating the above process, the resolution of the image data made up of multiple pages on the hard disk 304*b* can be converted, as well.

Converting the resolution of the stored image data so as to reduce the amount of image data increases the amount of available capacity on the hard disk 304*b*, thereby facilitating effective use of the hard disk 304*b*.

The image data read from the image storing unit 304, or the image data to be printed without being stored in the image storing unit 304, is sent to the smoothing unit 305. At the smoothing unit 305, 1-bit data is converted into 8-bit data, and image data signals are converted into either "0" or "255".

At the smoothing unit 305, the resolution of the image data is converted such that it is equivalent to the basic resolution at the time of printing. For example, in the event that the resolution of the image data stored on the hard disk 304*b* is 300 dpi and the basic resolution at the time of printing is 600 dpi, the 300 dpi image data which has been sent from the hard disk 304*b* via the buffer memory 304*c* and control unit 303 is subjected to processing wherein interpolated bit-mapped image data is added in both main scanning and sub-scanning directions, thereby creating image data equivalent to 600 dpi.

The smoothed image data is input to the γ correction unit 306. At the γ correction unit 306, conversion by LUT which takes into consideration the properties of the printer unit 204 is performed at the time of outputting the concentration data, thereby adjusting the output according to the concentration values set by the operating unit 700.

Figure 4:
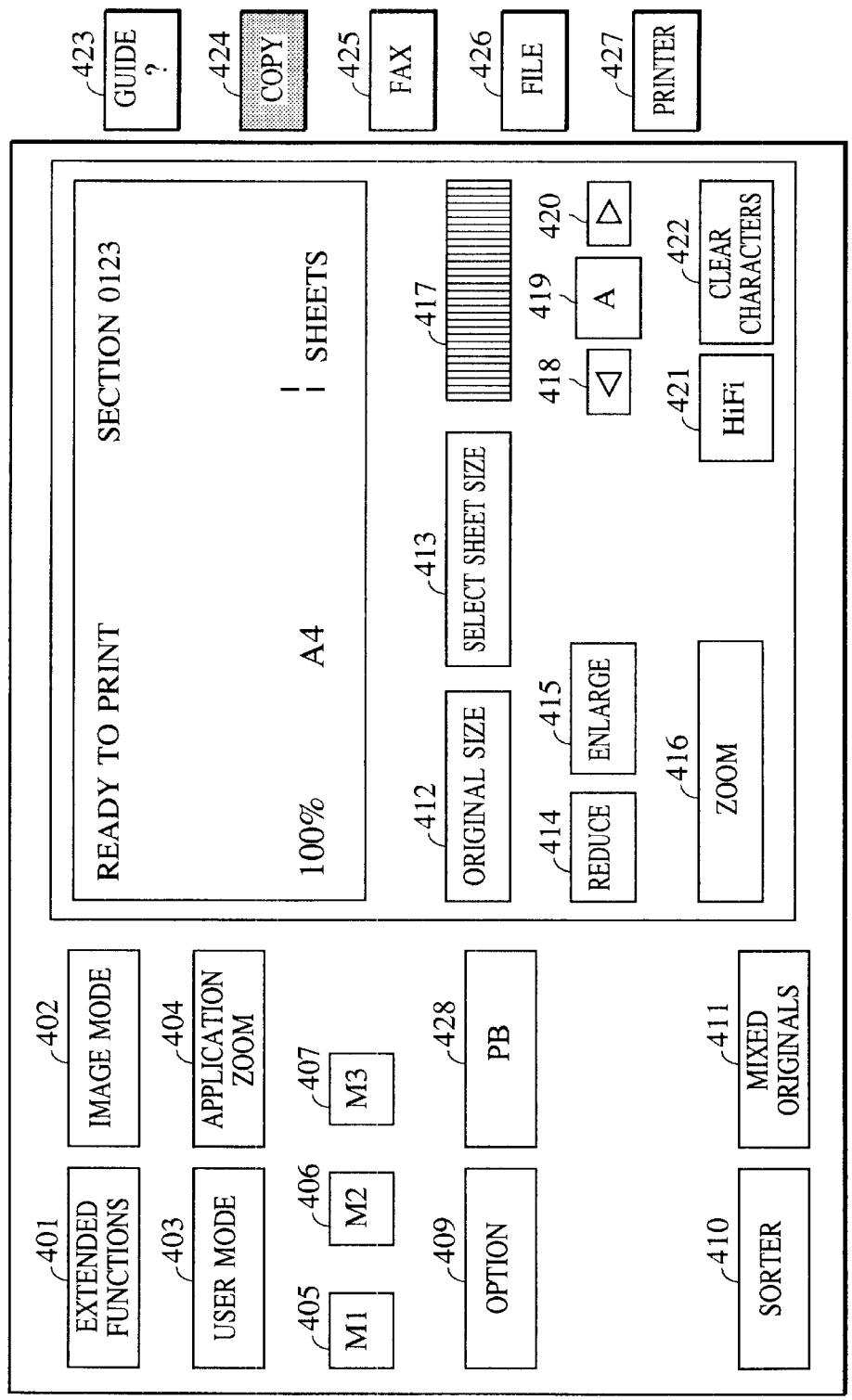
FIG. 4 is a diagram illustrating the operating unit of the photocopier apparatus.

FIG. 4 is an explanatory diagram illustrating a basic screen displayed at the operating unit 700 of the photocopier device according to the present embodiment.

This screen is a touch-panel, and each of the functions displayed thereupon can be executed by pressing displays within the frame thereof.

The Copy Mode key 424 is a key to be pressed when conducting photocopying operations. Pressing the Extended Functions key 401 enters modes for setting such as both-side copying, multiple copying, moving, binding margin, frame removing, and so forth. Pressing the Image Mode key 402 enters modes for setting such as shading, shadowing, trimming, masking, etc., of the copied image. The User Mode key 403 is pressed for registering mode memory and setting the standard mode screen. Pressing the Application Zoom key 404 enters the mode for independently changing the magnification of the X-direction and Y-direction of the original, and the mode of the zoom program which calculates the rate of change in magnification between the original size and copied size.

The M1 key 405, M2 key 406, and M3 key 407 are pressed when calling up mode memory corresponding to each key. The Option key 409 is a key for initiating the mode for setting optional functions such as for a film projector which directly makes copies from film.

The Sorter key 410 is a key for setting whether to use a mechanical sorter or electronic sorter, and mode settings such as sorting and grouping of the sorter, and so forth. Mixed Originals key 411 is pressed when setting A4 size and A3 size originals or B5 size and B4 originals together on the original feeder.

The Original Size key 412 is for setting the copying magnification at 100%. The Reduce key 414 and Enlarge key 415, respectively, are for reducing and enlarging the set size. The Select Sheet Size key 413 is pressed when selecting the photocopying paper. The Concentration keys 418 and 420 are such that each time the Concentration key 418 is pressed the copy is printed darker, and each time the Concentration key 420 is pressed the copy is printed lighter. The concentration display 417 moves to the left or right each time the Concentration keys 418 and 420 are pressed. The AE key 419 is pressed when automatically adjusting the concentration for original documents having a dark paper color, such as newspapers.

The HiFi key 421 is pressed when copying original documents with a great deal of gray scale concentrations, such as newspapers. The Clear Characters key 422 is pressed when it is desired to clarify the characters in a character document. Pressing the Guide ? key 423 when the user does not understand a certain function displays an explanation of the key in question.

The FAX key 425 is pressed for facsimile communication, and the File key 426 is pressed to output file data.

The printer key 427 is pressed to change the printing concentration or to refer to the printout results of the PDL image data output from the host computer 1000.

The PB key 428 is a personal box key, and is pressed to print out the image data stored in the hard disk 304*b* within the image storing unit 304.

The personal box will now be described with reference to FIG. 5. The hard disk 304*b* within the image storing unit 304 is comprised of a temporary storage area 600 and a personal box area 601. The temporary storage area 600 is an area for temporarily storing image data for electronic storing; this image data is erased after completing the job.

The personal box area 601 is an area for storing the rendered image data from the PDL data sent from the host computer 1000 within a personal box in the personal box area 601 that corresponds with the personal box number received from the host computer 1000.

Figure 5:
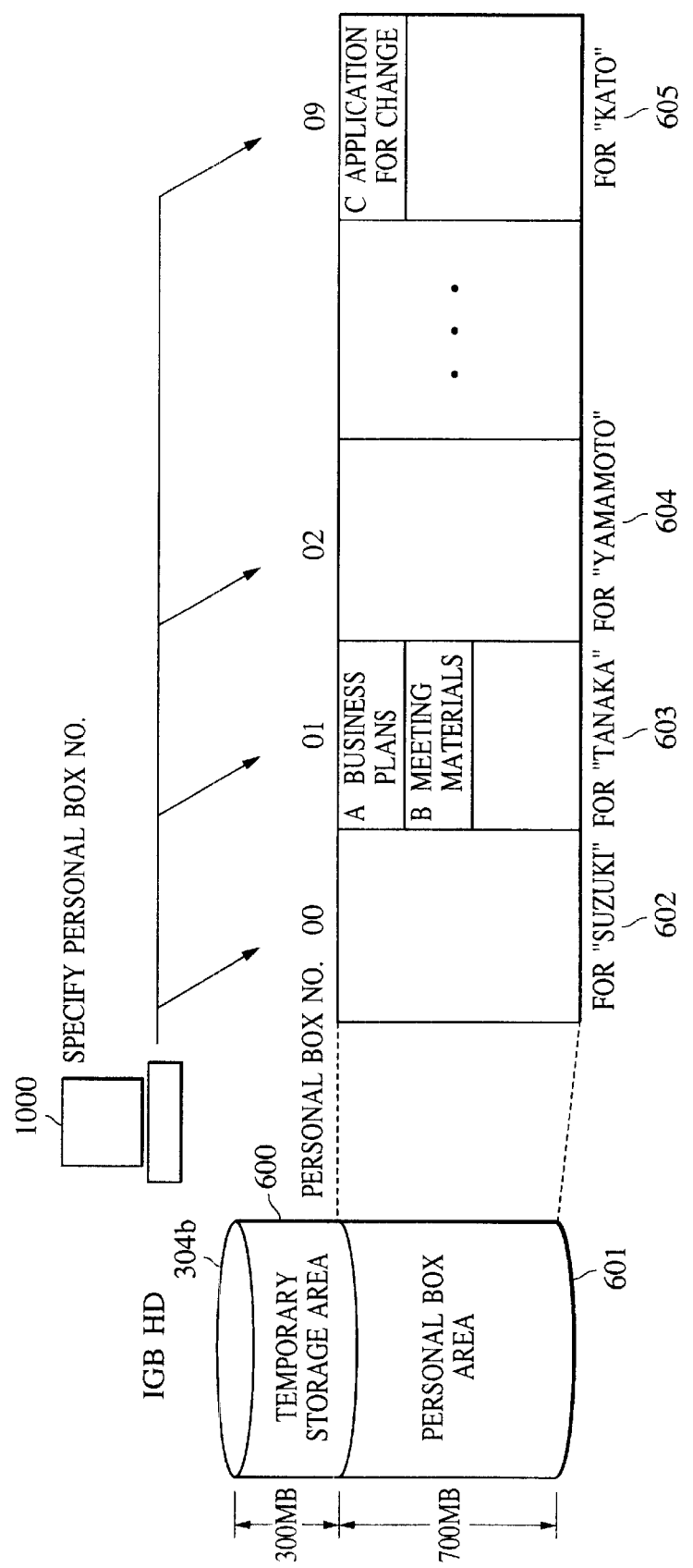
FIG. 5 is a diagram describing a personal box.

For example, as shown in FIG. 5, in the event that the hard disk has a capacity of 1 GB, 300 MB are allocated to the temporary storage area 600 and 700 MB are allocated to the personal box area. Also, in the event that the number of personal boxes is 10, the box area that each can have is 70 MB apiece. Each personal box has a number, for example, boxes 602, 603, 604, . . . , 605 having personal box numbers 00, 01, 02, . . . , 09.

Then, the user selects the personal box within the personal box area 601 in which the image data to be printed is stored, using the operating unit 700. At this time, the image data stored within the personal box can be printed by means of inputting a password corresponding with the selected personal box.

Each personal box has a different password. By means of arranging such that only the person to which the personal box has been allotted knows the password thereof, the image data stored within that individual's personal box cannot be accessed unless the password is entered, thereby preventing others accessing the image data therein.

Incidentally, as for the method by which the owner of the personal box is identified, a magnetic card stored with code corresponding with each individual may be read.

Figure 6:
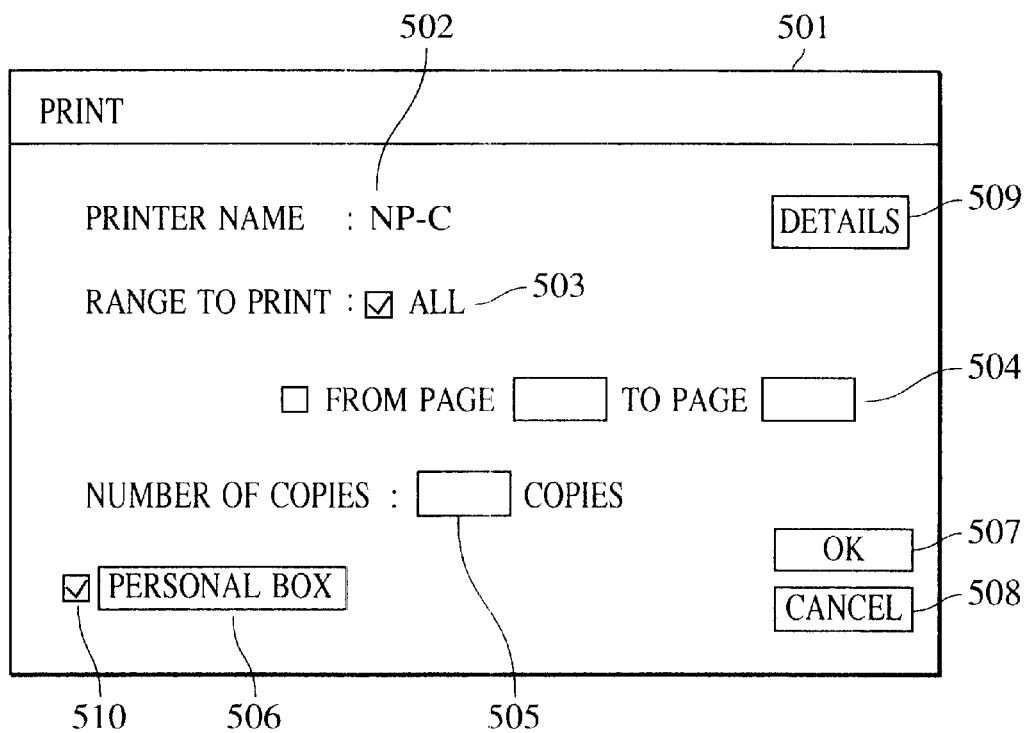
FIG. 6 is a diagram illustrating a printout window displayed by the application software.

FIG. 6 shows a window 501 displayed on the host computer 1000. This window being used for instructing printing of document data from application software and specifying the personal box.

The window 501 is displayed when printing has been specified by the application menu. Reference numeral 502 denotes the name of the presently set printer, e.g., the name of a photocopier connected to the network, in the case of the present embodiment. Reference numerals 503 and 504 denote displays showing the setting of the range of printing, to set either printing all pages or printing from page so-and-so to page so-and-so. In this case, the user selects whether to instruct printing of all pages or printing of a range of pages by positioning the pointer over the relevant box and checking the box by clicking on the mouse.

Reference numeral 505 denotes a display box showing sets the number of copies to be made. Reference numeral 509 denotes a details button, used for entering into the mode for setting the printing resolution, for example. After setting for printing, positioning the pointer over the OK button 507 and clicking on the mouse initiates printing. In the case of canceling the printing settings, positioning the pointer over the Cancel button 508 and clicking on the mouse cancels the printing settings.

At this time, if the display box 510 is not checked, the data is printed immediately. In the event that the document data is not to be printed immediately, but the personal box is to be used, i.e., in the event that the document data is to be temporarily stored in the personal box, the user positions the pointer over the box 510 and checks it by clicking on the mouse, then presses (clicks) the Personal Box button 506, thereby entering the personal box specifying mode.

Figure 7:
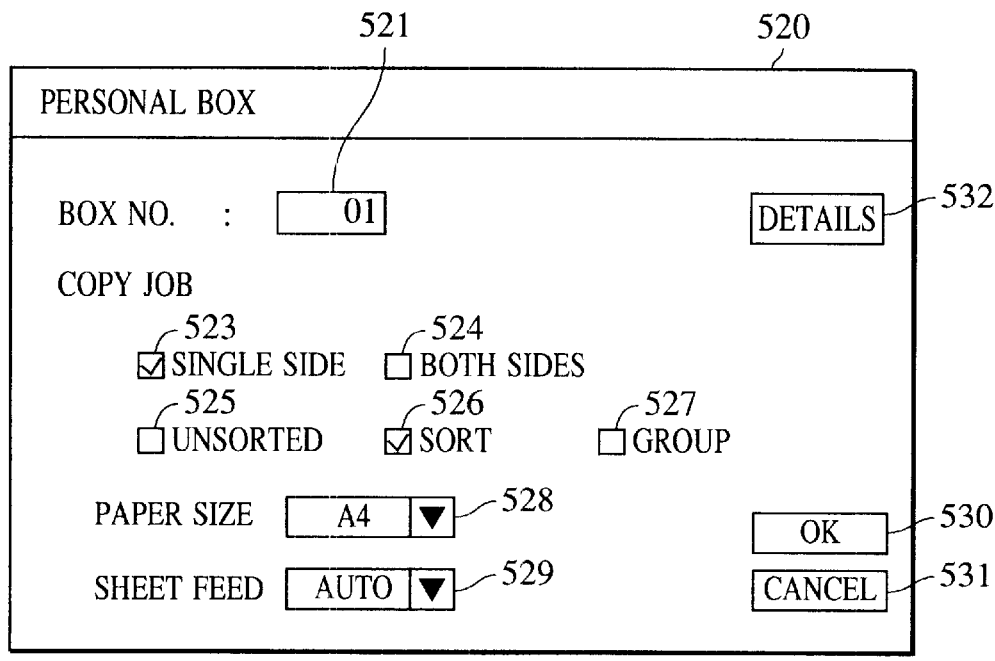
FIG. 7 is a diagram illustrating a personal box window.

FIG. 7 illustrates the personal box window 520 which opens in the event that the Personal Box button 506 is pressed in the printing setting window 501 which is displayed on the host computer 1000 when printing document data from an application or specifying a personal box.

At the personal box window 520, the personal box in which the document from the application software is to be stored is specified, and the mode for printing the document data is set instead of setting from the operating unit 700 of the photocopier.

Reference numeral 523 denotes a displays box showing the single-side printing setting, and in the event that the user positions the pointer over the box and checks it by clicking on the mouse, the document data job is carried out by single-side printing. On the other hand, reference numeral 524 denotes a display box showing the both-side printing setting, and in the event that the user positions the pointer over the box and checks it by clicking on the mouse, the document data job is carried out by both-side printing.

In the event that the user desires to print the document data job stored in the personal box by unsorted printing, the user positions the pointer over the display box 525 and checks it, or in the event that electronic sorting is to be executed, the user checks the display box 526, and in the event that group printing is to be executed, the user checks the display box 527.

Reference numeral 528 denotes a display box showing the setting the paper size to be actually used when printing. For example, clicking on the downward pointing scrolling mark to the right of 528 allows for selecting of paper sizes such as A4, A5, b4, and so forth. Reference numeral 529 denotes a display box showing the selected cassette from which the paper is fed when printing. For example, clicking on the downward pointing scrolling mark to the right of 529 allows for selecting between the upper cassette 131 and lower cassette 132. In the case that the setting is "Auto" as shown in the Figure, the cassette which holds the copying paper that is the same as the paper size specified by display box 528 is automatically selected. Reference numeral 532 denotes a button for entering into modes for detailed settings, e.g., reduced layouts such as 2-in-1 and 4-in-1.

Reference numeral 531 denotes a Cancel button, for voiding settings regarding the personal box and returning to the window 501. 530 denotes an OK button, and is pressed when all settings regarding the personal box have been completed and the contents that have been set are to be validated. After pressing, the screen returns to the window 501 shown in FIG. 6, and pressing the OK button 530 here transfers the document data from the application to the personal box.

Figure 8:
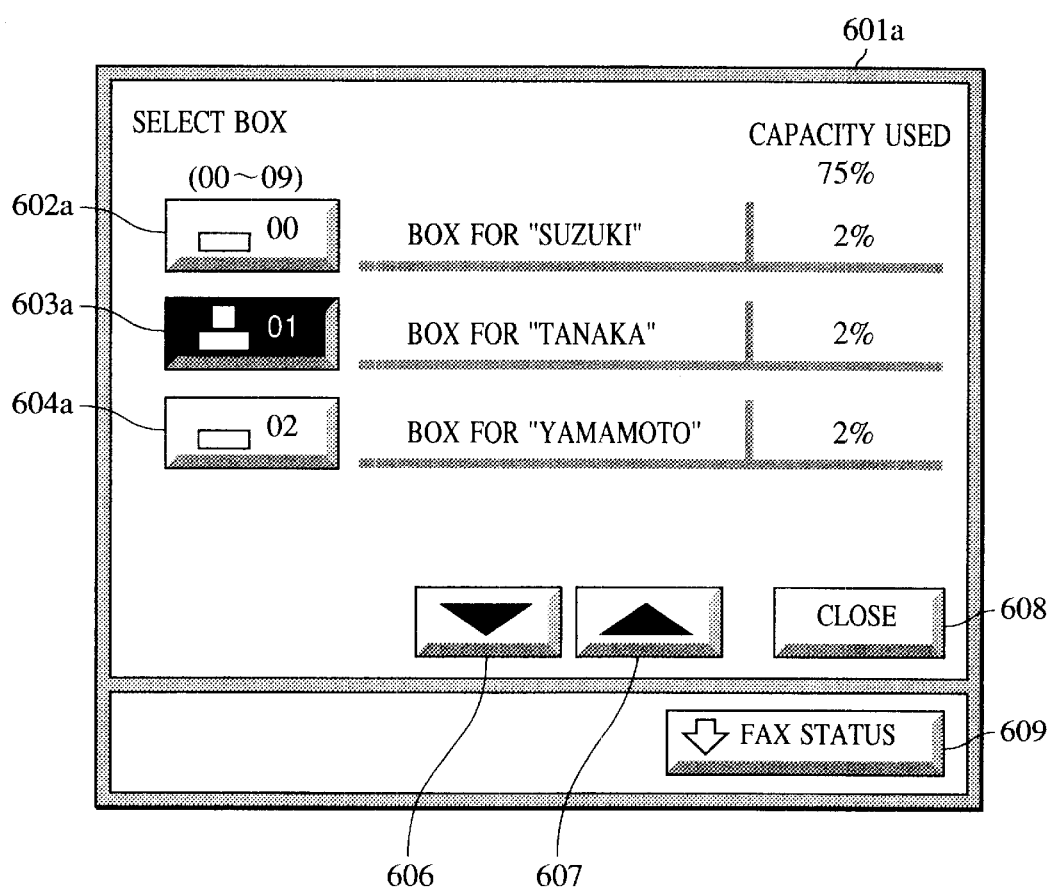
FIG. 8 is a diagram illustrating a screen for the operating unit.

FIG. 8 is the standard screen 601a for the personal box at the operating unit. Reference character 601a denotes the main screen for personal boxes that is displayed on the operating unit 700 of the photocopier, and is displayed by pressing the personal box key 428 of the operating unit 700. The screen 601a is for displaying that the image data input from the host computer 1000 is stored in each of the personal boxes. Each personal box is provided with a personal box number. Names are applied to each of the personal box numbers by an unshown screen at the operating unit.

For example, personal box No. 01 is provided with a name "BOX FOR TANAKA", indicating that the personal box has been registered as a personal box for Mr. Tanaka to use. Thus, only Mr. Tanaka himself, who knows the password that corresponds to this personal box, is able to print the image data stored therein.

Also, the percentage displays shown to the right end of each box indicates the percentage of the capacity of the box that is being used. For example, in the event that the hard disk capacity of the personal box area is 700 MB, box No. 01 is using 2% thereof, which is approximately 14 MB.

In the present embodiment, the resolution of the image data is converted based on "attributes" information of the image data stored in the personal boxes. For example, the time at which image data is stored in the personal box and a predetermined period, or the number of times that the image data stored in the personal box is printed, are used as attributes information, which is correlated with the image data and stored.

A description will now be made regarding a method of converting the resolution of image data wherein the time at which image data is stored in the personal box and a predetermined period are used as attributes information. In the present embodiment, the resolution of image data is converted after the predetermined period of time elapses after the image data is stored in the personal box.

For example, in the event that the predetermined period is seven days, and 600 dpi image data is stored in the personal box, the date and time at which this image data was stored in the personal box, and seven days which is the predetermined period, are correlated with the image data as attributes information, and stored. Then, based on this attributes information, the resolution is converted.

In this case, the 600 dpi image data stored in the personal box is converted into 300 dpi image data after 7 days following the image data having been stored.

Incidentally, the time at which the image data stored in the personal box was printed may be used as the attributes information. According to the present embodiment, the resolution is converted when a predetermined period elapses after the image data stored in the personal box is printed.

For example, in the event that the predetermined period is seven days, the date and time at which this image data stored in the personal box was printed, and seven days which is the predetermined period, are correlated with the image data as attributes information, and stored. Then, based on this attributes information, the resolution is converted. In this case, the resolution of the image data stored in the personal box is converted after 7 days following the image data having been printed.

A description will now be made regarding a method of converting the resolution of image data wherein the number of times that the image data stored in the personal box has been printed is used as attributes information for conversion of the resolution of the image data. In the present embodiment, the number of times that the image data stored in the personal box has been printed, and a standard number of times of printing set for the personal box, are correlated with the image data as attributes information, and stored. Then, the device counts how many times each piece of image data is printed within a predetermined period, and the resolution of the image data which has not been printed very many times is converted.

For example, in the event that the standard number of times of printing is one time, the device checks whether the image data has been printed a number of times equal to or less than the standard number of times of printing, and in the event that the image data has been printed a number of times equal to or less than the standard number of times of printing, the resolution thereof is converted.

In this way, the resolution of the image data stored in the personal box is converted based on the attributes information thereof, thereby reducing the amount of image data being stored, thus increasing the amount of available capacity on the hard disk 304*b*, hence facilitating effective use of the personal box.

As another example, the resolution of the image data in the personal box may be converted by checking whether the amount of image data presently stored in the personal box has exceeded a predetermined capacity.

For example, an arrangement may be made wherein the resolution of the image data is to be converted in the event that the amount of image data in the personal box reaches a maximum usage capacity of 90%, and the resolution of the image data in the personal box is converted by checking whether the amount of image data in the personal box 304*b* has exceeded the maximum usage capacity of 90%.

Also, image data with a resolution of 150 dpi or less has little meaning as image data, since the characters become blotchy. Accordingly, 150 dpi for example is set as a minimum resolution, and in the event that image data of 150 dpi or less is stored in the personal box, that image data is automatically erased from the hard disk 304*b* without conversion of resolution.

Accordingly, image data equal to or less than the minimum resolution is automatically erased, so the available capacity in the personal box is further increased, and the advantages of effectively using the personal box are further facilitated.

Reference characters 602*a*, 603*a*, and 604*a* denote buttons for entering modes for displaying the job contents stored in the boxes with the Nos. 00, 01, and 02, respectively. Reference numerals 606 and 607 denote vertical scrolling keys, which can be pressed to scroll the screen, thereby enabling the user to observe the box number, name, and usage capacity of personal boxes which have image data stored therein but are not displayed on the screen.

Reference numeral 608 denotes a Close key, and pressing this returns to the main screen shown in FIG. 4. Reference numeral 609 denotes a FAX Status key, and pressing this enables the user to confirm the status of facsimile transmission and reception.

Figure 9:
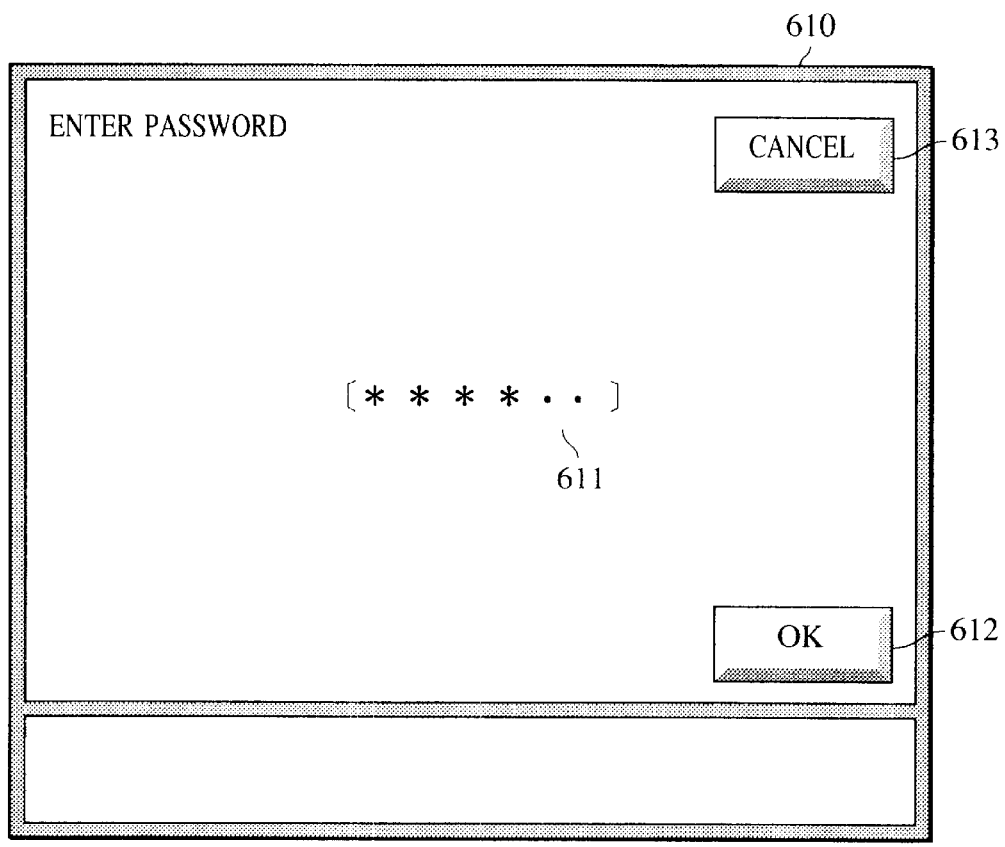
FIG. 9 is a diagram illustrating the password input screen.

FIG. 9 is a password input screen on the operating unit 700 of the photocopier. Reference numeral 610 denotes the password input screen for a personal box, this screen being displayed in the event that a box number button corresponding with a personal box between 602*a* and 604*a* owned by the user is pressed.

The password to be input there is a password for printing the image data, correlated with the personal box. The password used here is such that only the owner of the personal box knows it.

In this way, making sure that only the owner of the personal box knows the password, the image data in the personal box of the owner cannot be accessed by others, so there is no danger of the image data of the owner of the personal box being accessed by others.

Input of the password is performed from the numeric keys 690. In order to prevent the input value from being accessed by others, at display area 611, the digits already input are represented by asterisk "*" marks, and the digits which have not been yet input are represented by dots "•".

Reference numeral 612 denotes an OK key, which initiates verification of the input password. Reference numeral 613 denotes a Cancel key, which cancels input of the printing password, and returns to the main screen 601*a* of the personal box.

Figure 10:
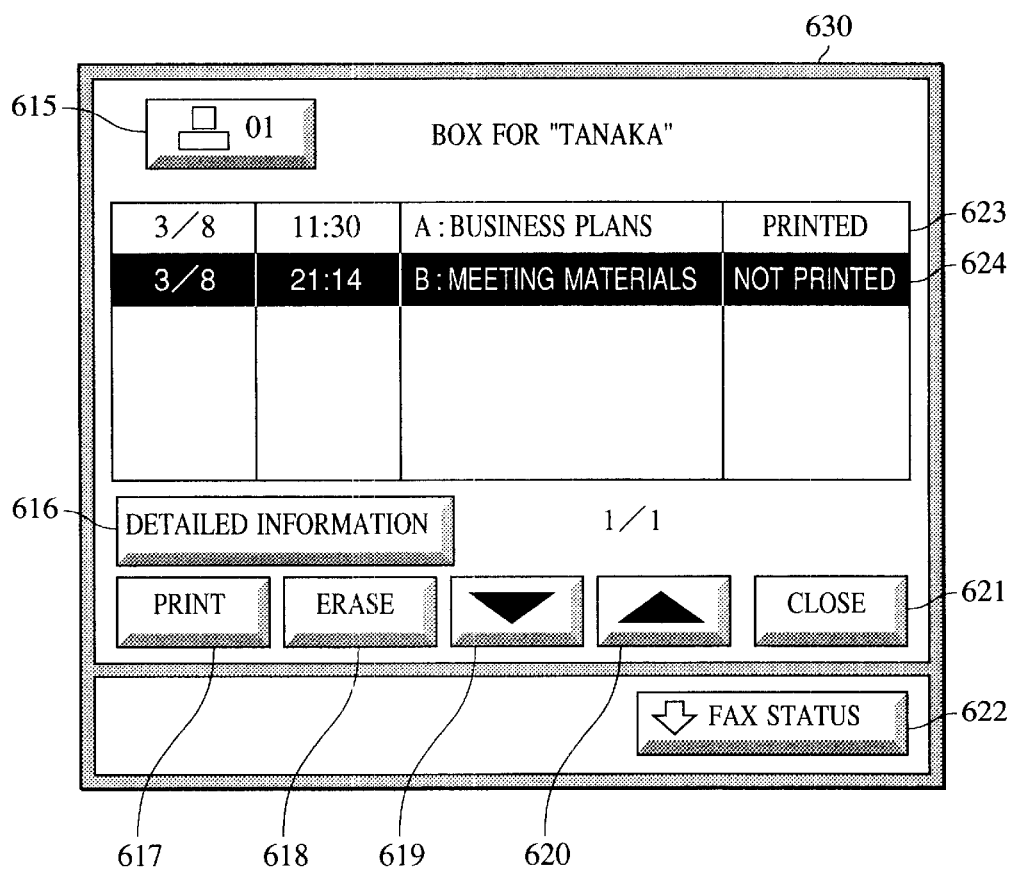
FIG. 10 is also a diagram illustrating a screen for the operating unit.

FIG. 10 shows a screen 630 showing information stored in the personal box (the date and time that the image data was stored, document name, whether the data has been printed) that has been specified in the screen 601*a*. Reference numeral 630 denotes a screen for displaying information stored in the personal box. This screen is displayed in the event that the printing password input in the screen 610 is correct.

For example, Mr. Tanaka, who is the owner of box No. 01, inputs a printing password which only he knows, and verification thereof is executed, whereby he can observe the screen 630. Verification processing of the password is executed by the CPU 206 of the photocopier. Displays 623 and 624 represent information stored by the host computer 1000 specifying this personal box.

Display 623 indicates that a document called "A: Business Plans" has been stored from the host computer 1000 to this box at 11:30 on March 8. Here, the word "Printed" displayed to the right indicates that the document has been printed at least once since being stored in this box. An arrangement may also be employed wherein displaying "NG" to the right end of this area indicates that the hard disk or personal box was full and the document could not be properly stored.

Display 624 indicates that a document called "B: Meeting Materials" has been stored from the host computer 1000 to this box at 21:14 on March 11. Here, the word "Not Printed" displayed to the right indicates that the document has not yet been printed since being stored in this box. Touching display 624 inverts the line 624 of this job.

Reference numeral 616 denotes a Detailed Information key, and is a key for displaying detailed information about the job for which the line has been inverted. This is a key for displaying detailed information set in the printing windows 501 and 520 of the application on the host computer 1000, such as "Print 3 copies on both sides of A4 paper". Also, the job information can be changed at this time, such as changing the number of copies to be made from 3 to 5, and so forth.

Reference numeral 617 denotes a Print key, and pressing this button initiates printing of the data to be printed of the job indicated by the inverted line, according to the contents of the job setting. Reference numeral 618 denotes an Erase key, and is pressed when deleting the image data corresponding to the inverted line from the hard disk 304*b*.

Reference numeral 619 and 620 denote vertical scrolling keys, which are used for scrolling the screen when displaying the contents of a great number of jobs which cannot fit onto one screen. Key 622 enables confirmation of the status of facsimile transmission and reception. Reference numeral 621 denotes a Close key, to be pressed when returning to the personal box screen 601*a* shown in FIG. 8.

Figure 11:
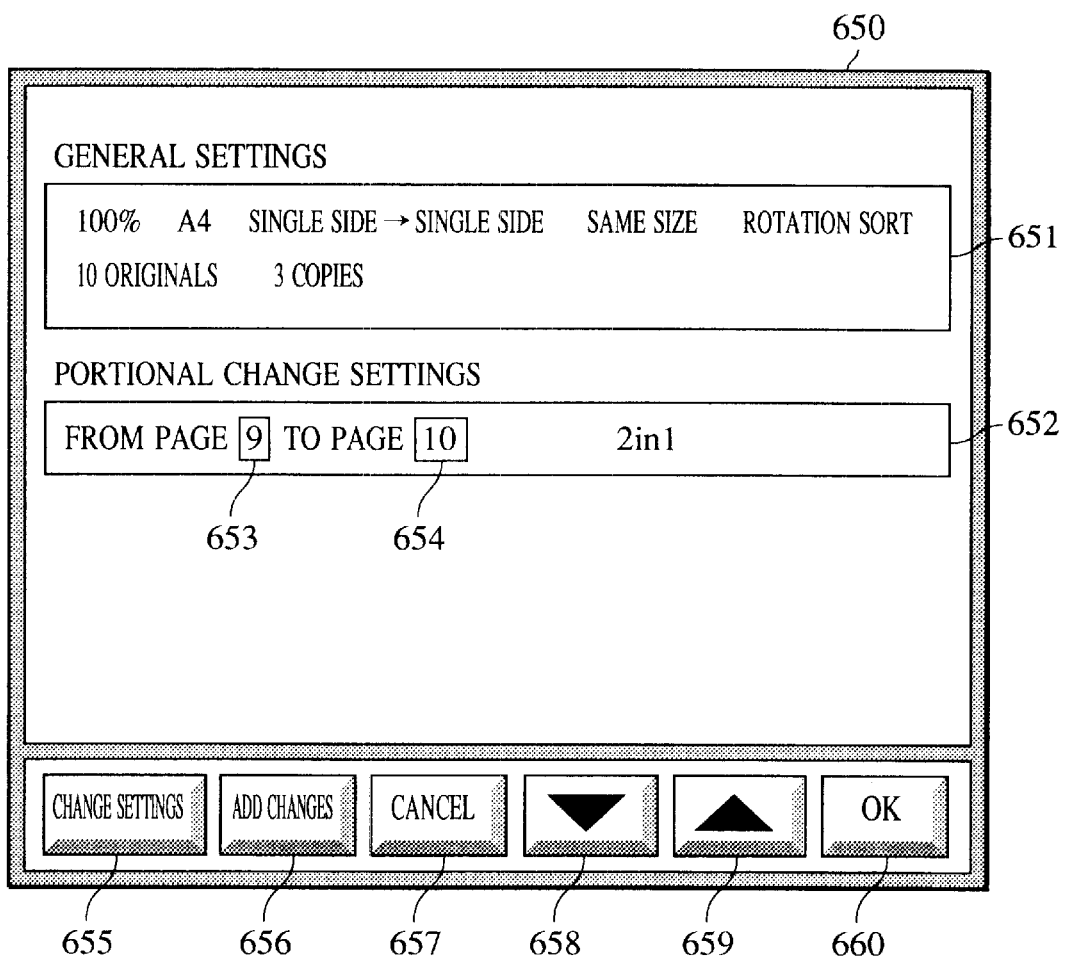
FIG. 11 is another diagram illustrating a screen for the operating unit.

FIG. 11 shows a screen 650 which comes up due to the Detailed Information key 616 being pressed. The detailed information screen 650 displays the detailed information of the job contents in the personal box selected in the screen 630.

The General Settings information display frame 651 shows detailed information set in the printing windows 501 and 520 of the application on the host computer 1000, such as "Print 3 copies on one side of A4 paper". For example, in FIG. 11, this indicates that the 3 sets of the 10 documents are to be made on A4 paper at 100% magnification and on one side of the paper, and that rotational sorting is to be executed in order to have 3 sorted sets.

The portional change specifying frame 652 is a screen for displaying the page range displayed in the general settings information display frame 651 to which the user desires to make changes, and job contents of that page range to which the user desires to make changes.

Using the key 653 for specifying the first page for the changes and the key 654 for specifying the last page for the changes, the user sets the page range for changes in the print job contents. Then, in an unshown screen displayed by pressing the Change Settings key 655, the job contents of the page range to which the user desires to make changes is set. For example, in FIG. 11, shows that the print job has been change such that page 9 through page 10 should be printed as 2-in-1. The Add Changes key 656 is a key for setting further changes to the contents of the print job, in addition to those already displayed. The added changes to the contents of the print job are displayed below the portional change specifying frame 652.

Also, in the event that the user desires to change all of the information, pressing the general settings information display frame 651 displays an unshown screen, whereby the contents of the print job can be set.

The Cancel key 657 is a key used for canceling the changes to the print job displayed in the portional change specifying frame 652.

The vertical scrolling keys 658 and 659 are used for scrolling the screen when displaying a great number of changes to jobs which cannot fit onto one screen. The OK key 660 here sets the changes to the print job, and returns to the screen 630 shown in FIG. 10.

Figure 12:
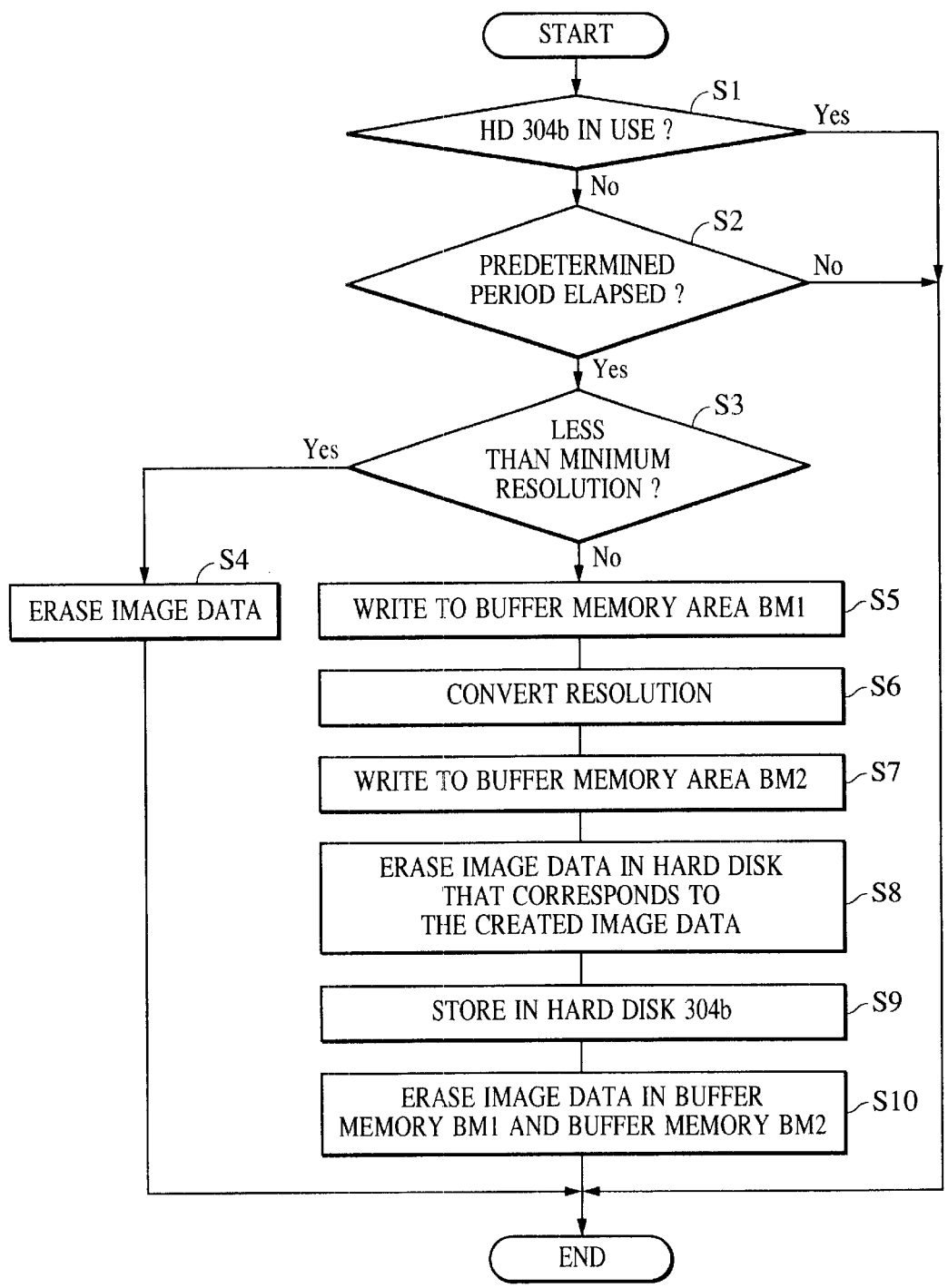
FIG. 12 is a flowchart illustrating the processing of image data.

The processing for converting the resolution of the image data stored in the personal box based on attributes information will now be described with reference to FIG. 12. This process is performed at certain intervals.

First, the process checks whether the hard disk 304*b* is in use (step S1). If in use, the process ends. If not in use, the process checks whether the predetermined period from the time of storing the image data has elapsed (step S2). In the event that the predetermined period from the time of storing the image data has not elapsed, the process ends. In the event that the predetermined period has elapsed, the resolution of this image data is checked, whether it is equal to or less than the minimum resolution (step S3). In the event that it is equal to or less than the minimum resolution, this image data is deleted (Step S4).

In the event that the image data is not equal to or less than the minimum resolution, the image data is read from the hard disk 304*b*, and is written to the buffer memory area BM1 included in the buffer memory 304*c* (step S5).

The image data written to the buffer memory area BM1 is skipped for every other dot in the main scanning direction and for every other line in the sub-scanning direction, thereby creating image data of which the resolution has been converted (step S6). The created image data is written to the buffer memory area BM2 included in the buffer memory 304*c* (step S7). The image data on the hard disk 304*b* which corresponds to the created image data is erased (Step S8).

The image data written to the buffer memory area BM2 is stored on the hard disk 304*b* (step S9). The image data in the buffer memory area BM1 and the buffer memory area BM2 are erased (step S10). These steps are carried out by the CPU 206, and this process is conducted regularly for all image data in the personal boxes.

The amount of time needed for processing differs according to the amount of image data stored in the personal boxes, so a timer might be set such that this process is conducted at night, so as to not interfere with other work.

Incidentally, the above-mentioned step S2 is a step to be carried out based on the attributes information of the image data, so an arrangement may be used wherein the process checks whether a predetermined period has elapsed from the time that the image data stored in the personal box has been printed, instead of the above-mentioned, step S2. In the event that the predetermined period has elapsed, the process proceeds to step S3, and if not, the process ends.

Also, an arrangement may be used wherein the process checks whether the amount of image data presently using the hard disk 304*b* has exceeded a predetermined capacity, instead of the above-mentioned step S2. In the event that the image data exceeds the predetermined capacity, the process proceeds to step S3, and if not, the process ends.

Figure 13:
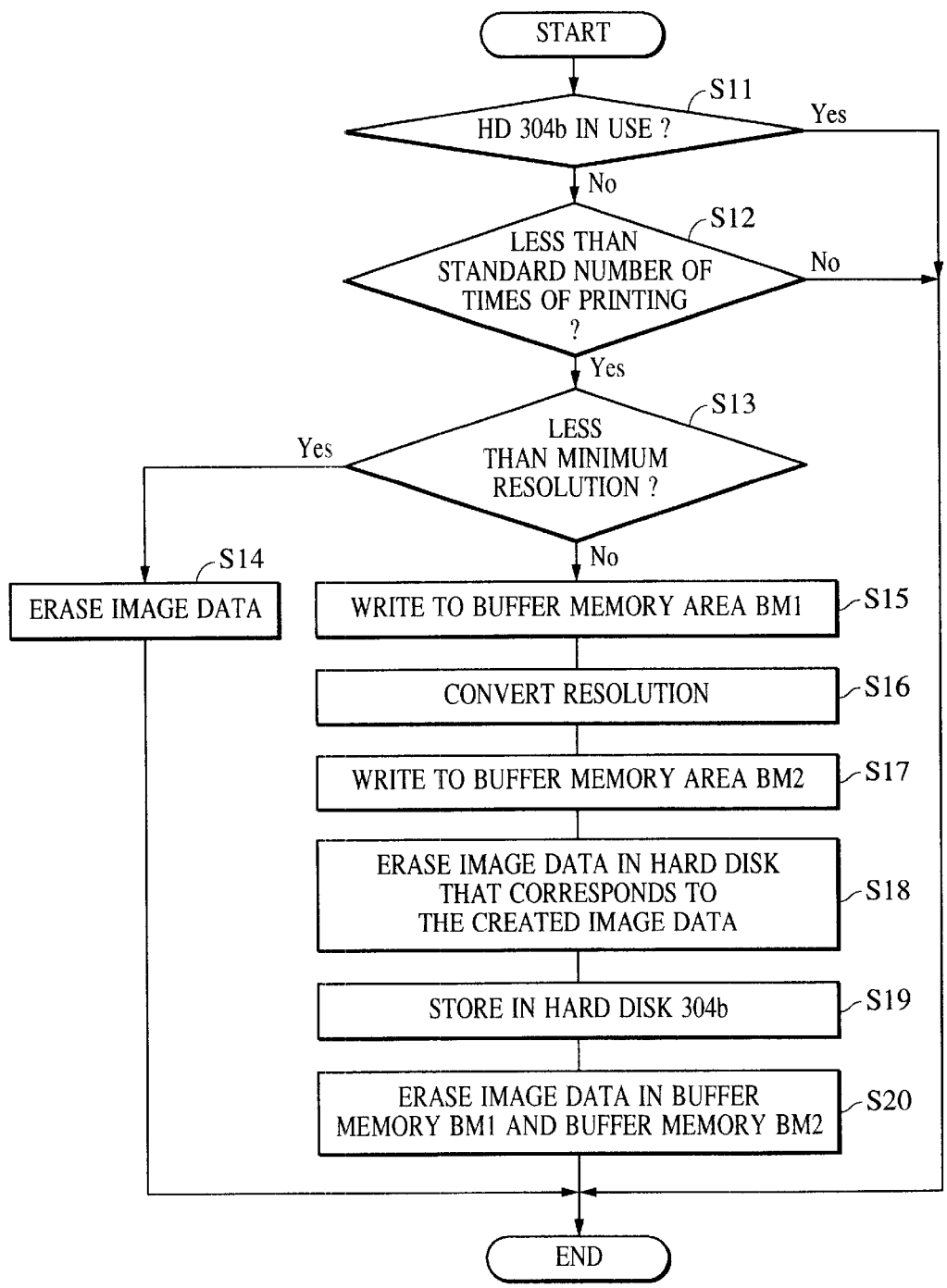
FIG. 13 also is a flowchart illustrating the processing of image data.

Further, the resolution of the image data stored in the personal box may be converted according to the following steps. This will be described with reference to FIG. 13. This is a process which is carried out based on counting the number of times that each piece of image data is printed within a predetermined period.

First, the process checks whether the hard disk 304b is in use (step S11). If in use, the process ends. If not in use, the process checks whether the number of times that the document has been printed within a predetermined period is equal to or less than a standard number of times of printing (step S12).

In the event that the number of times that the document has been printed within the predetermined period is neither equal to nor less than the standard number of times of printing, the process ends. In the event that the number of times that the document has been printed within the predetermined period is equal to or less than the standard number of times of printing, the resolution of this image data is checked, whether it is equal to or less than the minimum resolution (step S13). In the event that it is equal to or less than the minimum resolution, this image data is erased (Step S14). In the event that the image data is not equal to or less than the minimum resolution, the image data is read from the hard disk 304b, and is written to the buffer memory area BM1 included in the buffer memory 304c (step S15).

The image data written to the buffer memory area BM1 is skipped for every other dot in the main scanning direction and for every other line in the sub-scanning direction, thereby creating image data of which the resolution has been converted (step S16). The created image data is written to the buffer memory area BM2 (step S17). The image data on the hard disk 304b which corresponds to the created image data is erased (Step S18).

The image data written to the buffer memory area BM2 is stored on the hard disk 304b (step S19). The image data in the buffer memory area BM1 and the buffer memory area BM2 are erased (step S20).

These steps are carried out regularly by the CPU 206 for all image data in the personal boxes.

Such converting of the resolution of the image data stored in the personal boxes based on attributes information so as to reduce the amount of image data increases the amount of available capacity in the personal boxes, thereby facilitating effective use thereof.

Also, image data equal to or less than the minimum resolution is automatically erased from the hard disk 304b based on attributes information, so the available capacity in the personal box is further increased, and the advantages of effectively using the personal boxes are further facilitated.

Incidentally, the program code necessary for these steps may be stored in a storage medium such as a floppy disk (FD) or the like, in which arrangement the computer reads the program code from the floppy disk and executes it, thereby realizing the functions of the above steps from the computer.

In this case, there is no need to store program code for executing the above steps within the computer, thus saving capacity and consequently saving costs. Also, storage mediums other than floppy disks and hard disks include, for example, CD-ROMs, optical disks, optical magnetic disks, magnetic tape, nonvolatile memory cards, etc.

Second Embodiment

Though the first embodiment converted the resolution of the image data based on the attributes information thereof, this second embodiment converts the number of bits per pixel (dot) of the image data based on the attributes information thereof.

For example, in the event that the number of bits per pixel in the image data store in the personal box is 8 bits, the number of bits per pixel is converted to 4 bits, based on the attributes information thereof.

A description will be made regarding the case in which image data having more than 1 bit per pixel, e.g., 4 bits or 8 bits, is stored in a personal box will now be made with reference to FIG. 3.

In the event of storing image data with 8 bits per pixel in a personal box, the 8-bit image data input to the log converting unit 301 is directly input (shown by the dashed line) to the control unit 303 without passing through the binarizing unit 302.

In the event of storing image data with 4 bits per pixel in a personal box, the lower 4 bits data of the 8-bit image data input to the log converting unit 301 are masked and the data is directly input to the control unit 303 without passing through the binarizing unit 302.

Figure 14:
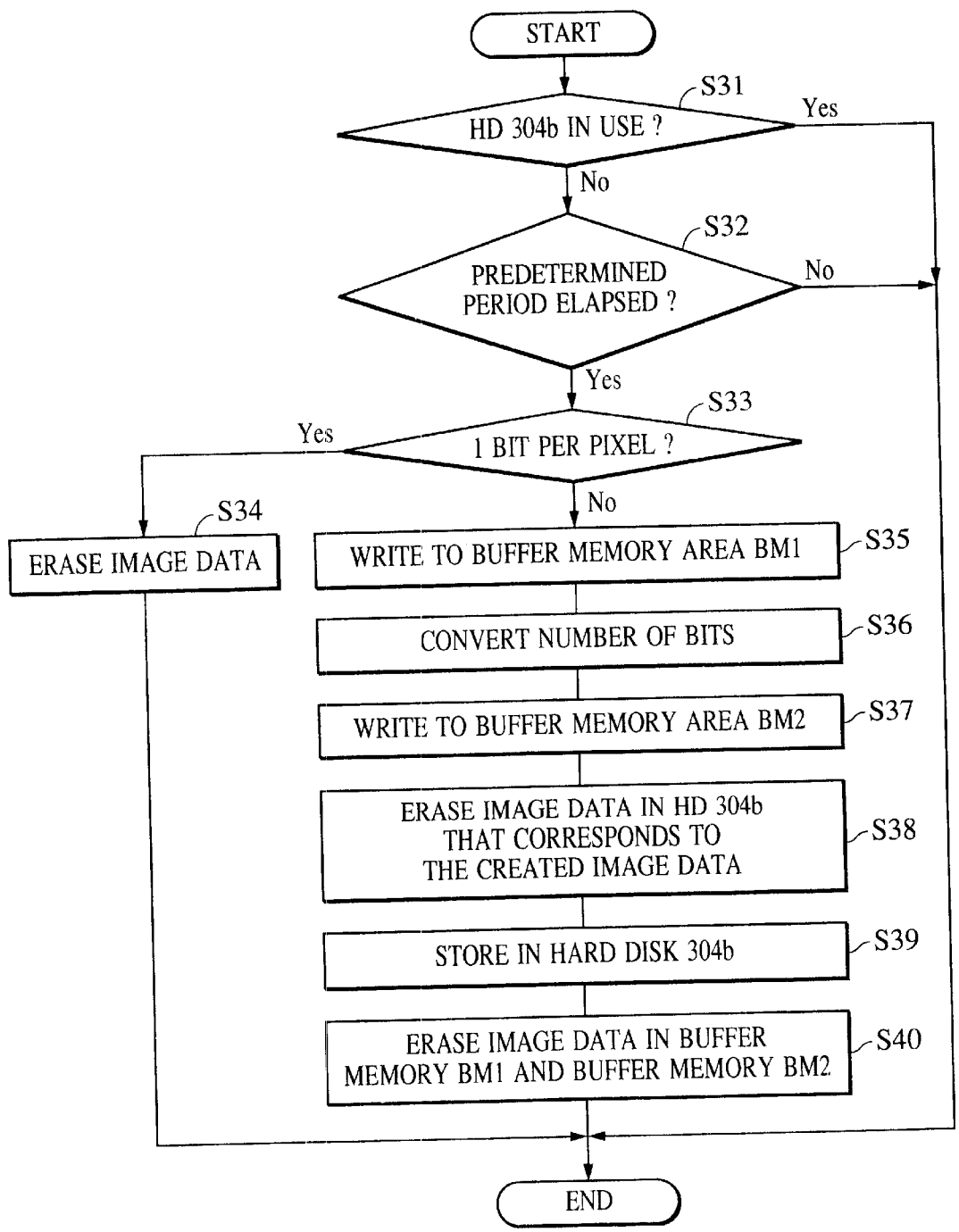
FIG. 14 is another flowchart illustrating the processing of image data.

Description will now be made regarding the process of converting the number of bits per pixel of the image data stored in the personal box based on attributes information, with reference to FIG. 14. This process is performed at certain intervals.

First, the process checks whether the hard disk 304b is in use (step S31). If in use, the process ends. If not in use, the process checks whether or not the predetermined period from the time of storing the image data has elapsed (step S32).

In the event that the predetermined period from the time of storing the image data has not elapsed, the process ends. In the event that the predetermined period has elapsed, the image data is checked for whether the number of bits per pixel is 1 bit (step S33). In the event that the number of bits per pixel is 1 bit, this image data is erased (Step S34). In the event that the number of bits per pixel is not 1 bit, the image data is read from the hard disk 304b, and is written to the buffer memory area BM1 included in the buffer memory 304c (step S35).

The image data written to the buffer memory area BM1 is converted, e.g., if 8-bit data, to 4-bit data, or if 4-bit data, to 1-bit data, thereby creating image data (step S36). In other words, the depth of bits per pixel is reduced in step S36.

The created image data is written to the buffer memory area BM2 included in the buffer memory 304c (step S37). The image data on the hard disk 304b which corresponds to the created image data is erased (Step S38).

The image data written to the buffer memory area BM2 is stored on the hard disk 304b (step S39). The image data in the buffer memory area BM1 and the buffer memory area BM2 are erased (step S40). These steps are carried out by the CPU 206, and this process is conducted regularly for all image data in the personal boxes.

Such converting of the number of bits per pixel of the image data stored in the personal boxes based on attributes information so as to reduce the amount of image data increases the amount of available capacity in the personal boxes, thereby facilitating effective use thereof.

Also, image data with 1 bit per pixel is automatically erased from the hard disk based on attributes information, so the available capacity in the personal box is further increased, and the advantages of effectively using the personal boxes are further facilitated.

Third Embodiment

This converts color image data stored in the personal box into monochrome image data based on the attributes information thereof.

A description will now be made regarding cases of storing color image data in personal boxes. In FIG. 3, CMY signals are generated based on the input RGB signals, black character signals are further added, thereby generating CMYK signals. Then, in the binarizing unit 302, each bit of the CMYK signals is converted into 1 bit, and the binarized image data is stored in the hard disk 304b via the control unit 303.

At the buffer memory 604C, the color image data is converted into monochrome image data, based on a B/W information converting table corresponding with the CMYK signal bit array. The converting table is stored in the ROM 207 within the CPU circuit 205.

Figure 15:
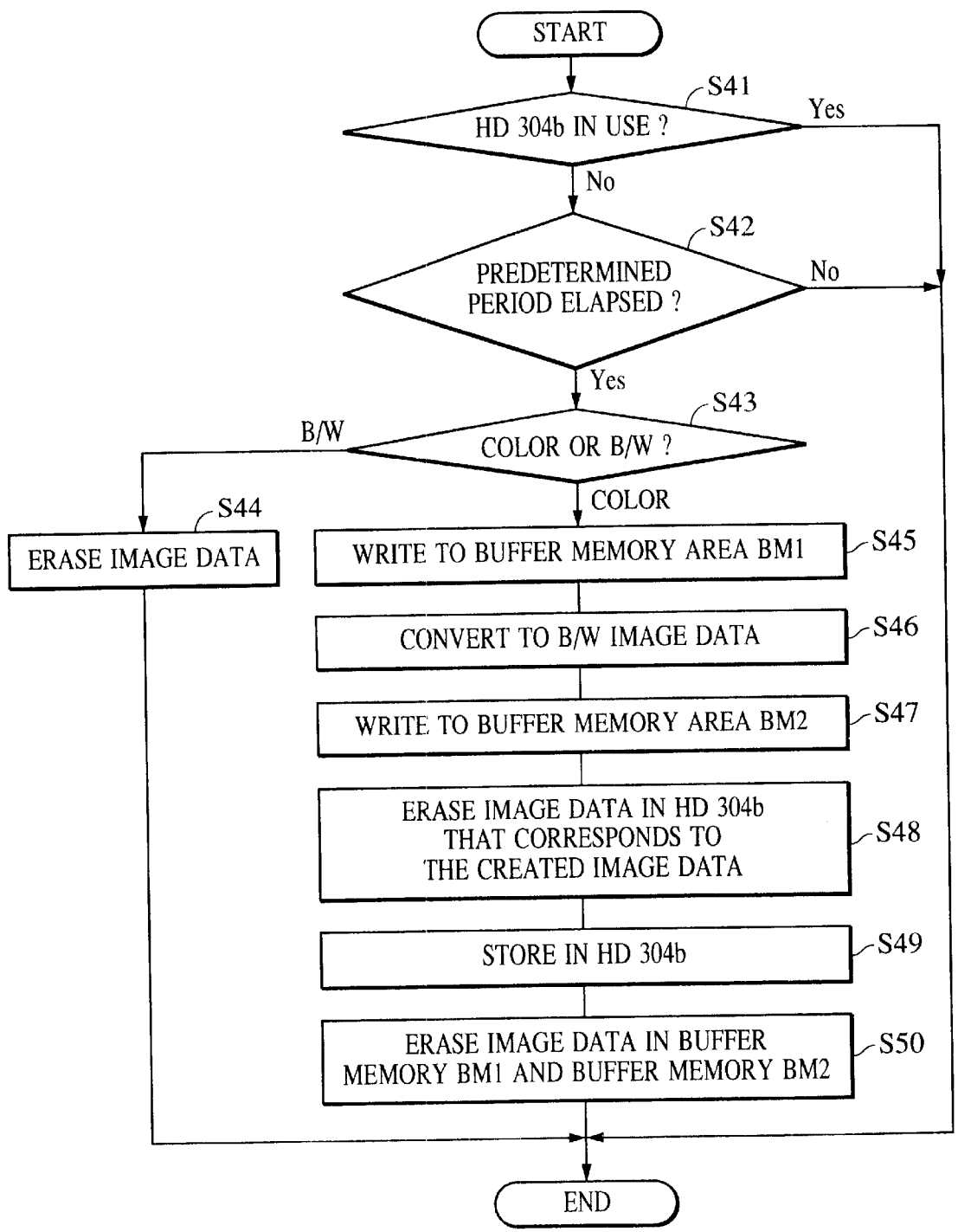
FIG. 15 is yet another flowchart illustrating the processing of image data.

The process of converting color image data stored in the personal box into monochrome image data based on the attributes information thereof will be described with reference to the flowchart shown in FIG. 15. This is a process which is carried out regularly.

First, the process checks whether the hard disk 304b is in use (step S41). If in use, the process ends. If not in use, the process checks whether the predetermined period from the time of storing the image data has elapsed (step S42).

In the event that the predetermined period from the time of storing the image data has not elapsed, the process ends. In the event that the predetermined period has elapsed, the image data is checked, whether it is color image data or B/W image data (step S43). In the event that it is B/W image data, this image data is erased (Step S44). In the event that the image data is color image data, the image data is read from the hard disk 304b, and is written to the buffer memory area BM1 included in the buffer memory 304c (step S45).

Monochrome (B/W) image data is created based on the image data read to the buffer memory area BM1 and the conversion table (step S46). The created B/W image data is written to the buffer memory area BM2 (step S47). The image data on the hard disk 304b which corresponds to the created B/W image data is erased (Step S48).

The B/W image data written to the buffer memory area BM2 is stored on the hard disk 304b (step S49). The color image data in the buffer memory area BM1 and the buffer memory area BM2 are deleted (step S50).

Such converting of the color image data stored in the personal boxes into monochrome images based on attributes information thereof so as to reduce the amount of image data increases the amount of available capacity in the personal boxes, thereby facilitating effective use thereof.

Also, monochrome image data is automatically erased from the hard disk 304b based on attributes information, so the available capacity in the personal box is further increased, and the advantages of effectively using the personal boxes are further facilitated.

Incidentally, the user can set the attributes information such as the predetermined period, standard number of times of printing, etc., described in the above first through third embodiments. Also, separate settings may be made for each personal box.

Figure 16:
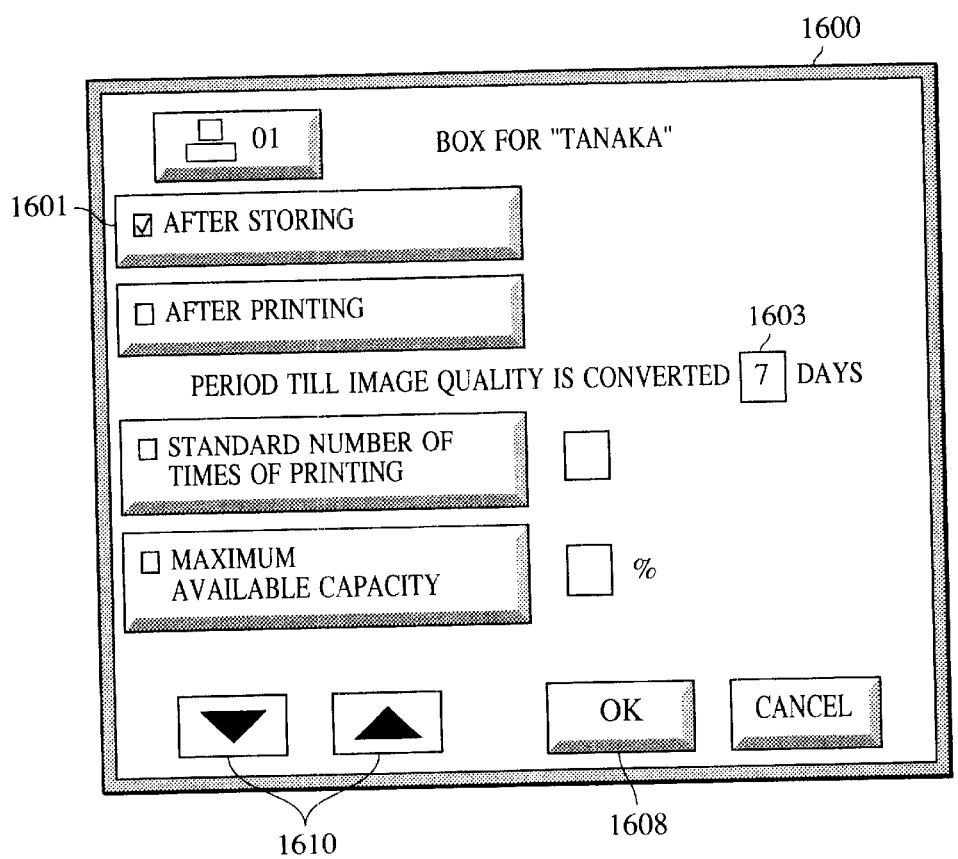
FIG. 16 is a diagram illustrating a screen for the operating unit.

FIG. 16 shows a screen 1600 for making settings for a personal box. The screen 1600 is displayed on the operating unit 700. For example, the screen 1600 shown in FIG. 16 is for making settings for the personal box No. 01 of Mr. Tanaka.

For example, in the event that the user selects the Settings key 1601 and uses the up and down scrolling keys 1610 to set a period till conversion of the image quality of the image data, the period which the user has set is displayed in the period displaying area 1603. Then, pressing the OK key 1608 in this state switches to a screen 1700 such as shown in FIG. 17.

Figure 17:
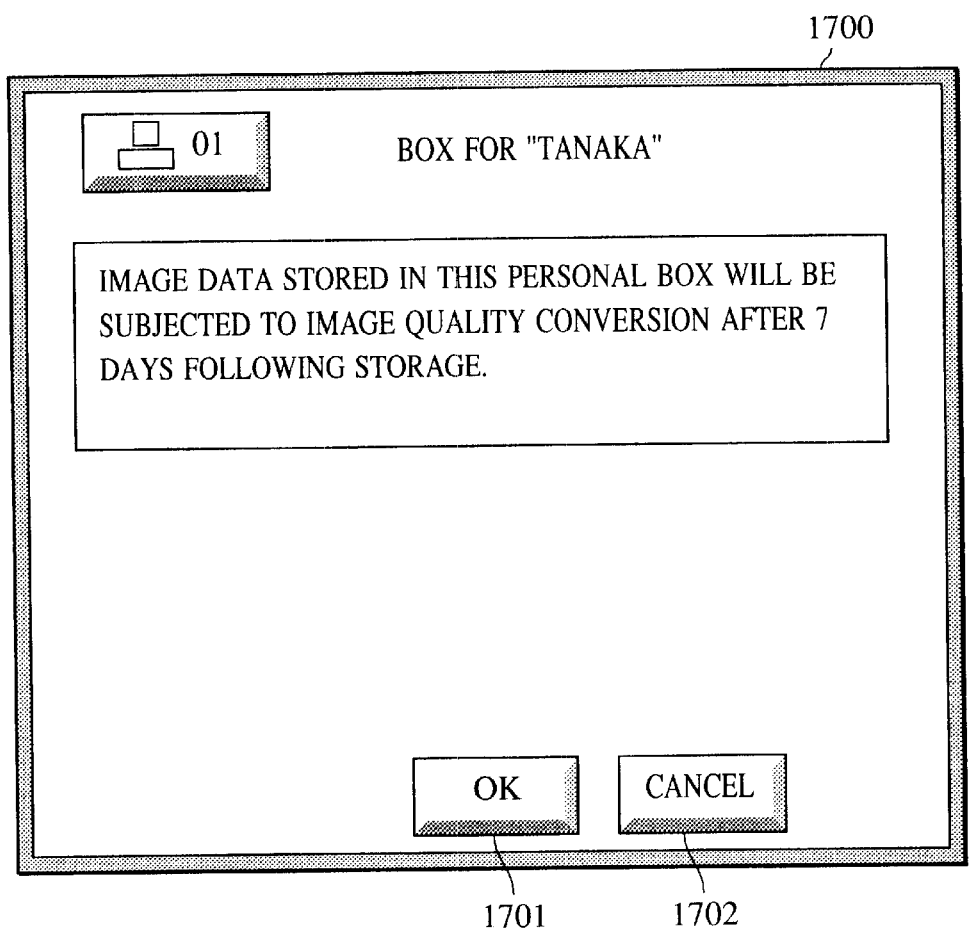
FIG. 17 also is a diagram illustrating a screen for the operating unit.

The screen 1700 shown in FIG. 17 is for confirming the contents set in the screen 1600. For example, the user is notified with a message to the effect of: "IMAGE DATA STORED IN THIS PERSONAL BOX WILL BE SUBJECTED TO IMAGE QUALITY CONVERSION AFTER 7 DAYS FOLLOWING STORAGE."

The OK key 1701 in the screen 1700 is for applying the contents set in the screen 1600 shown in FIG. 16. The Cancel key 1702 is for canceling the contents set in the screen 1600 shown in FIG. 16, and returning to the screen 1600.

In the event that the user presses the OK key 1701 in this screen, the settings for the personal box are completed.

Accordingly, the image data stored to the personal boxes is correlated with the time at which the image data was stored and the period that the user set.

Then, upon the period that the user set elapsing from the time at which the image data was stored, the image quality is converted so as to reduce the amount of data.

Figure 18:
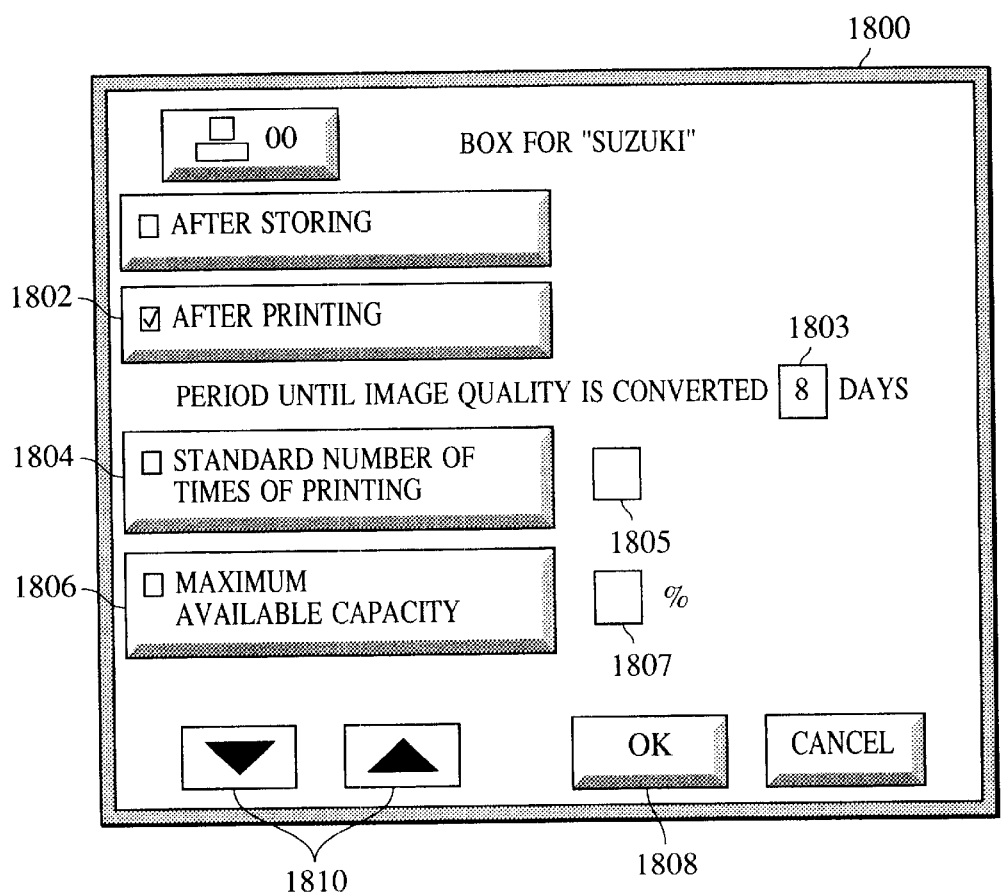
FIG. 18 is another diagram illustrating a screen for the operating unit.

Also, each user can separately made such settings. this will be described with reference to FIG. 18. The screen 1800 shown in FIG. 18 is for making settings for the personal box No. 00 of Mr. Suzuki.

For example, in the event that the user selects the Settings key 1802 and uses the up and down scrolling keys 1810 to set a period until conversion of the image quality of the image data, the period which the user has set is displayed in the period displaying area 1803. Then, pressing the OK key 1808 in this state switches to a screen 1900 such as shown in FIG. 19.

Figure 19:
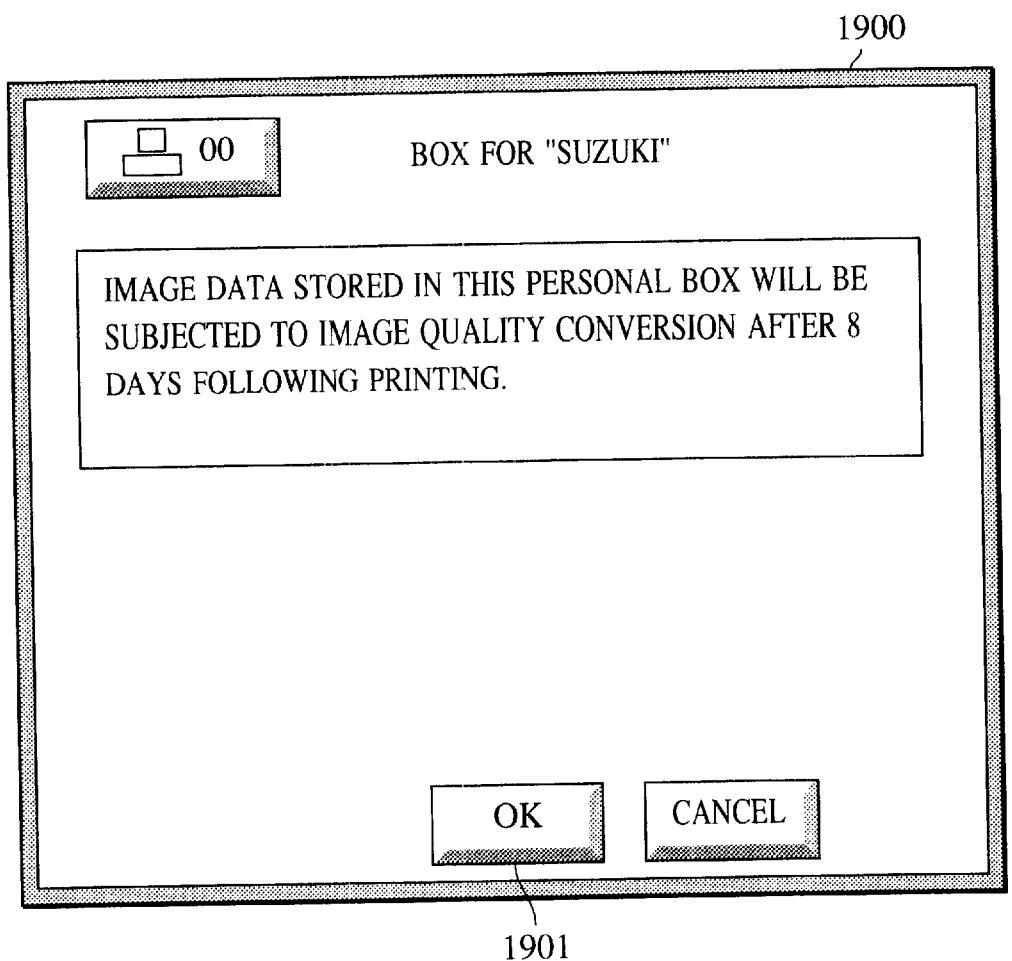
FIG. 19 is yet another diagram illustrating a screen for the operating unit.

The screen 1900 shown in FIG. 19 is for confirming the contents set in the screen 1800. For example, the user is notified with a message to the effect of: "IMAGE DATA STORED IN THIS PERSONAL BOX WILL BE SUBJECTED TO IMAGE QUALITY CONVERSION AFTER 8 DAYS FOLLOWING PRINTING."

In the event that the user presses the OK key 1901 in this screen, the setting for the personal box is completed.

Accordingly, at the time of printing the image data in the personal box, the image data stored to the personal boxes is correlated with the time at which the image data was printed and the period that the user set.

Then, upon the period that the user set elapsing from the time at which the image data was printed, the image quality is converted.

Incidentally, in the event of selecting Selection key 1804 in screen 1800 of FIG. 18, the standard number of times of printing and the period until converting the image quality are set using the up and down scrolling keys 1810. In this case, the standard number of times of printing set by the user is displayed in the area 1805 for displaying the standard number of times of printing, and the period set by the user is displayed in the period display area 1803.

Figure 20:
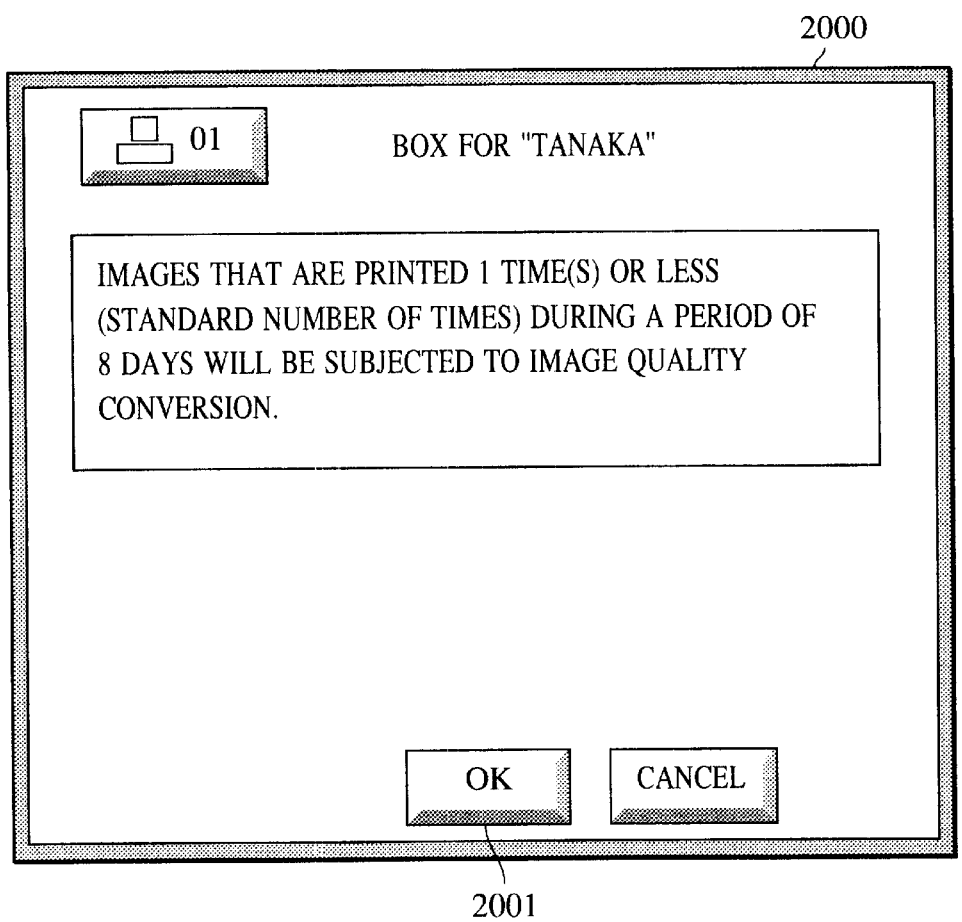
FIG. 20 is still another diagram illustrating a screen for the operating unit.

Then, pressing the OK key 1808 in this state switches to a screen 2000 such as shown in FIG. 20.

The screen 2000 shown in FIG. 20 is for confirming the contents set in the screen 1800. For example, the user is notified with a message to the effect of: "IMAGES THAT ARE PRINTED 1 TIME(S) OR LESS (STANDARD NUMBER OF TIMES) DURING A PERIOD OF 8 DAYS WILL BE SUBJECTED TO IMAGE QUALITY CONVERSION."

In the event that the user presses the OK key 2001 in this screen 2000, the settings for the personal box are completed.

Further, in the event of selecting Selection key 1806 in screen 1800 of FIG. 18, the maximum usage capacity is set using the up and down scrolling keys 1810. In this case, the maximum usage capacity set by the user is displayed in the maximum usage capacity display area 1807.

Figure 21:
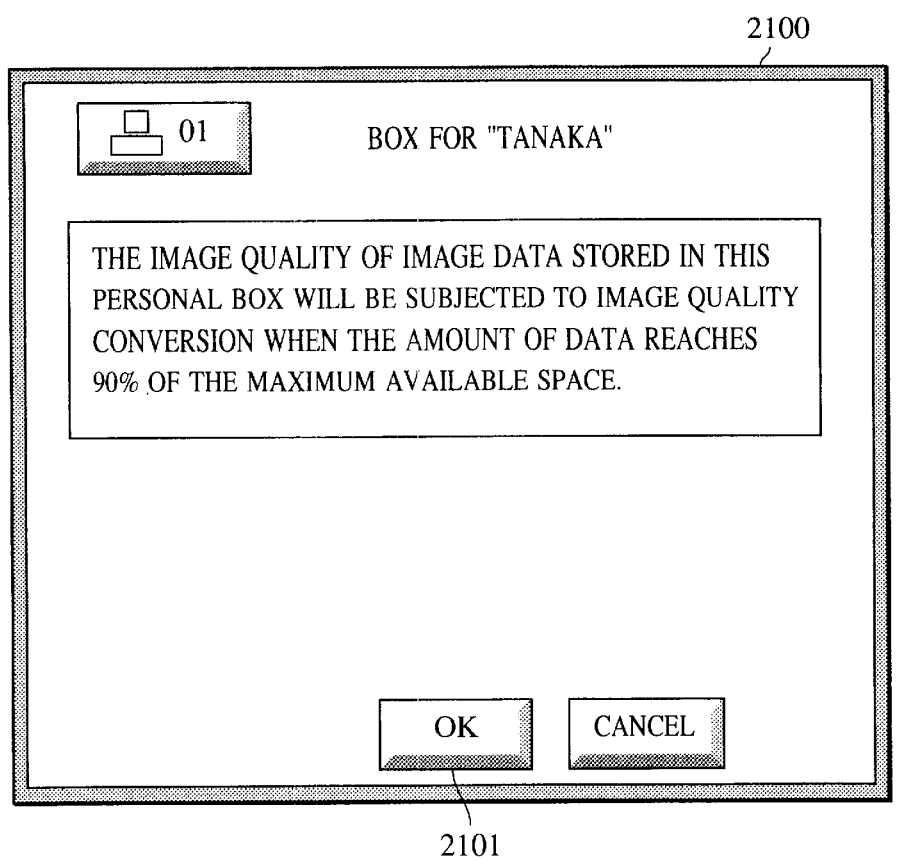
FIG. 21 is a still further diagram illustrating a screen for the operating unit.

Then, pressing the OK key 1808 in this state switches to a screen 2100 such as shown in FIG. 21.

The screen 2100 shown in FIG. 21 is for confirming the contents set in the screen 1800. For example, the user is notified with a message to the effect of: "THE IMAGE QUALITY OF IMAGE DATA STORED IN THIS PERSONAL BOX WILL BE SUBJECTED TO IMAGE QUALITY CONVERSION WHEN THE AMOUNT OF DATA REACHES 90% OF THE MAXIMUM AVAILABLE SPACE."

In the event that the user presses the OK key 2101 in this screen 2100, the settings for the personal box are completed.

The individual components shown in outline or designated by blocks in the drawings are all well-known in the image storing arts and their specific construction and operation are not critical to the operation or best mode for carrying out the invention.

While the invention has been described with reference to the structures disclosed herein, it is not confined to the details set fourth in this application, but rather is intended to cover such modifications or changes as may come within the spirit and the scope of the appended claims.

What is claimed is:

1. An image storing apparatus comprising:
   storing means having a plurality of storage areas, for storing image data output from a external apparatus; and
   converting means for converting the image quality of the image data stored in each of said storage areas, according to attributes information of the image data stored in each of said storage areas,
   wherein the converted quality image data from the converting means is stored in the storage areas.

2. An image storing apparatus according to claim 1, wherein said attributes information comprises a time at which the image data was stored in each of said storage areas, and a predetermined period stored in each of said storage areas.

3. An image storing apparatus according to claim 1, further comprising image forming means for forming an image on a sheet based on the image data stored by said storing means;
   wherein said attributes information comprises a time at which the image data stored in each of said storage areas was formed by said image forming means, and a predetermined period stored in each of said storage means.

4. An image storing apparatus according to claim 1, further comprising erasing means for automatically erasing the image data converted by said converting means based on the attributes information of the image data.

5. An image storing apparatus according to claim 1, wherein said converting means converts a resolution of the image data stored in each of said storage areas.

6. An image storing apparatus according to claim 1, wherein said converting means converts a number of bits per pixel of the image data stored in each of said storage areas.

7. An image storing apparatus according to claim 1, wherein said converting means converts a number of colors of image data stored in each of said storage areas.

8. An image storing apparatus according to claim 1, wherein said converting means drops the image quality of the image data stored in each of said storage areas by degrees, and erases the image data in the event that the image quality of the image data is equal to or less than a certain image quality.

9. An image storing apparatus according to claim 1, further comprising setting means for setting said attributes information of the image data stored in each of said storage areas.

10. An image storing apparatus comprising:
    storing means having a plurality of storage areas, for storing image data output from an external apparatus;
    converting means for converting the image quality of the image data stored in each of said storage areas, according to attributes information of the image data stored in each of said storage areas,
    image forming means for forming an image on a sheet based on the image data stored in said storing means; and
    counting means for counting a number of times that the image data stored in each of said storage areas has been formed by said image forming means within a predetermined period stored in each of said storage areas,
    wherein said attributes information comprises the number of times counted by said counting means.

11. An image storing apparatus, comprising:
    storing means having a plurality of storage areas, for storing image data output from an external apparatus; and
    converting means for converting the image quality of the image data stored in each of said storage areas, according to the amount of the image data reaching a predetermined value stored in each of said storage areas,
    wherein the converted quality image data from the converting means is stored in the storage area.

12. A computer-readable storage medium storing a program to be executed by a computer, said program comprising:
    a step for storing image data output from an external apparatus to a plurality of storage areas; and
    a step for converting the image quality of the image data stored in each of said storage areas, according to attributes information of the image data stored in each of said storage areas; and
    a step of storing the image quality converted image data in the storage areas.

13. A computer-readable storage medium storing a program to be executed by a computer said program comprising the steps of:
    a step for storing image data output from an external apparatus to a plurality of storage areas; and
    a step for converting the image quality of the image data stored in each of said storage areas, according to the amount of the image data reaching a predetermined value stored in each of said storage areas; and
    a step of storing the image quality converted image data in the storage areas.

14. An image data processing method, comprising:
    a step for storing image data output from an external apparatus to a plurality of storage areas; and
    a step for converting the image quality of the image data stored in each of said storage areas, according to attributes information of the image data stored in each of said storage areas; and
    a step of storing the image quality converted image data in the storage areas.

15. An image data processing method, comprising:
    a step for storing image data output from an external apparatus to a plurality of storage areas;
    a step for converting the image quality of the image data stored in each of said storage areas, according to the amount of the image data reaching a predetermined value stored in each of said storage areas; and a step of storing the image quality converted image data in the storage areas.

16. An image storing apparatus, comprising:

storing means having a plurality of storage areas, for storing image data output from an external device; and converting means for converting the image quality of the image data stored in each of said storage areas, according to a predetermined period elapsing from a time that said image data was stored in each of said storage areas.

17. An image storing apparatus according to claim 16, further comprising setting means for setting the predetermined period for each of said storage areas.

18. An image storing apparatus comprising:

storing means having a plurality of storage areas, for storing image data output from a external apparatus;

image forming means for forming an image on a sheet based on the image data stored by said storing means; and control means for executing a control so as to convert the image quality of the image data, according to a predetermined period elapsing from a time that the image data was formed by said image forming means and executing control to store the converted quality image data in the storage area.

19. An image storing apparatus according to claim 18, further comprising setting means for setting the predetermined period for each of the storage areas.

20. An image storing apparatus, comprising:

storing means having a plurality of storage areas, for storing image data output from an external apparatus;

image forming means for forming an image on a sheet based on the image data stored by said storing means;

counting means for counting a number of times that the image data stored in each of said storage areas has been formed by said image forming means within a predetermined period; and control means for executing a control so as to convert the image quality of the image data stored in each of said storage areas, according to the number of times counted by said counting means.

21. An image storing apparatus according to claim 20, wherein said control means compares a predetermined number of times with the number of times counted by said counting means, and in the event that the number of times counted by said counting means is equal to or less than said predetermined number of times, said control means executes a control so as to convert the image quality of the image data stored in each of said storage areas, said control means further comprising:

setting means for setting the predetermined period for each of said storage areas, and said predetermined number of times for each of said storage areas.

22. An image storing method, comprising the steps of:

storing image data output from an external device in a storing unit having a plurality of storage areas;

converting an image quality of the image data stored in each of the storage areas, according to a predetermined period elapsing from a time that the image data was stored in each of said storage areas; and storing the converted quality image data in the storage areas.

23. A computer-readable storage medium storing a program to be executed by a computer, said program comprising:

a step of storing image data output from an external device in a storing unit having a plurality of storage areas;

a step of converting an image quality of the image data stored in each of the storage areas, according to a predetermined period elapsing from a time that the image data was stored in each of said storage areas; and a step of storing the converted quality image data in the storage areas.

24. An image storing method, comprising the steps of:

storing image data output from a external apparatus in storing means having a plurality of storage areas;

forming an image on a sheet based on the image data stored by said storing means; and executing a control so as to convert the image quality of the image data, according to a predetermined period elapsing from a time that the image data was formed by said image forming means and to store the converted quality image data in the storage area.

25. A computer-readable storage medium storing a program to be executed by a computer, said program comprising:

a step of storing image data output from a external apparatus in storing means having a plurality of storage areas;

a step of forming an image on a sheet based on the image data stored by said storing means; and a step of executing a control so as to convert the image quality of the image data, according to a predetermined period elapsing from a time that the image data was formed by said image forming means and to store the converted quality image data in the storage area.

26. An image storing method, comprising the steps of:

storing image data output from an external apparatus in storing means having a plurality of storage areas;

converting the image quality of the image data stored in each of said storage areas, according to attributes information of the image data stored in each of said storage areas, forming an image on a sheet based on the image data stored in said storing means; and counting a number of times that the image data stored in each of said storage areas has been formed by said image forming means within a predetermined period stored in each of said storage areas, the attributes information including the number of times counted by said counting means.

27. A computer-readable storage medium storing a program to be executed by a computer, said program comprising:

a step of storing image data output from an external apparatus in storing means having a plurality of storage areas;

a step of converting the image quality of the image data stored in each of said storage areas, according to attributes information of the image data stored in each of said storage areas, a step of forming an image on a sheet based on the image data stored in said storing means; and a step of counting a number of times that the image data stored in each of said storage areas has been formed by said image forming means within a predetermined period stored in each of said storage areas, the attributes information including the number of times counted by said counting means.

28. A control method for an image storing apparatus which has a storing means having a plurality of storage areas for storing input image data and image forming means for forming an image on a sheet based on a data stored in said storage areas, said method comprising the steps of:

controlling a converter so as to convert the image data stored in said storage areas, according to attributes information of the image data stored in said storage areas; and controlling said storing means so as to store a converted data from said converter in the storage areas instead of the image data.

29. A method according to claim 28, further comprising a step of automatically erasing the converted data stored in the storage areas based on the attributes information of the image data.

30. A method according to claim 28, wherein said converter converts a resolution of the image data.

31. A method according to claim 28, wherein said converter converts a number of bits per pixel of the image data.

32. A method according to claim 28, wherein said converter converts a number of colors of image data.

33. A method according to claim 28, further comprising step of setting said attributes information of the image data in each of said storage means.

34. A method according to claim 28, wherein said image data is input from an external apparatus.

35. A method according to claim 28, wherein said attributes information comprises a time at which the image data was stored in said storage areas and a predetermined period.

36. A method according to claim 28, wherein said attributes information comprises a time at which the image data stored in said storage areas was formed by said image forming means and a predetermined period.

37. A method according to claim 28, wherein said attributes information comprises a number of times that the image data stored in said storage areas has been formed by said image forming means within a predetermined period.

38. In an image storing apparatus which has a storing means having a plurality of storage areas for storing input image data and image forming means for forming an image on a sheet based on a data stored in said storage means, a computer-readable storage medium storing a program to be executed by a computer, said program comprising:

a step of controlling a converter so as to convert the image data stored in said storage areas, according to attributes information of the image data stored in said storage areas; and a step of controlling said storing means so as to store a converted data from said converter in the storage areas instead of the image data.

39. A control method for an image storing apparatus which has a storing means having a plurality of storage areas for storing input image data and image forming means for forming an image on a sheet based on a data stored in said storage areas, said method comprising the steps of:

controlling a converter so as to convert the image data stored in said storage areas, according to the total amount of the image data stored by said storing means; and controlling said storing means so as to store a converted data from said converter in the storage areas instead of the image data.

40. In an image storing apparatus which has storing means having a plurality of storage areas for storing input image data and image forming means for forming an image on a sheet based on a data stored in said storage area, a computer-readable storage medium storing a program to be executed by a computer, said program comprising:

a step of controlling a converter so as to convert the image data stored in said storage areas, according to the total amount of the image data stored by said storing means; and a step of controlling said storing means so as to store a converted data from said converter in the storage areas instead of the image data.

\* \* \* \* \*

UNITED STATES PATENT AND TRADEMARK OFFICE
CERTIFICATE OF CORRECTION

PATENT NO. : 6,476,933 B1
DATED : November 5, 2002
INVENTOR(S) : Masayuki Honma

It is certified that error appears in the above-identified patent and that said Letters Patent is hereby corrected as shown below:

<u>Drawings,</u>
Sheet 16, FIG. 16, "TILL" should read -- UNTIL --.

<u>Column 4,</u>
Line 62, "in" should read -- on --; and
Line 67, "to" (second occurrence) should read -- on --.

<u>Column 5,</u>
Line 41, "one-fourth." should read -- one fourth. --.

<u>Column 6,</u>
Line 16, "setting" should read -- settings --.

<u>Column 7,</u>
Line 47, "sets" should be deleted.

<u>Column 8,</u>
Line 5, "displays" should read -- display --; and
Line 22, "setting" should read -- setting of --.

<u>Column 11,</u>
Line 36, "numeral" should read -- numerals --.

<u>Column 12,</u>
Line 1, "change" should read -- changed --.

<u>Column 14,</u>
Line 4, "store" should read -- stored --.

<u>Column 16,</u>
Line 19, "made such settings. this" should read -- make such settings. This --.

UNITED STATES PATENT AND TRADEMARK OFFICE
CERTIFICATE OF CORRECTION

PATENT NO.      : 6,476,933 B1
DATED           : November 5, 2002
INVENTOR(S)     : Masayuki Honma It is certified that error appears in the above-identified patent and that said Letters Patent is hereby corrected as shown below:

<u>Column 17, line 23 - Column 22, line 37,</u>
Claims 1-40 should be deleted and substituted with the following:

--1.     An image storing apparatus comprising:

storing means including a plurality of storage areas, for storing image data output from an external apparatus; and converting means for converting an image quality of the image data of said storage areas, according to attributes information of the image data of said storage areas, wherein a converted data, which is converted from the image quality of the image data of said storage areas by said converting means, is stored in the storage areas instead of the image data.

2.     An image storing apparatus according to Claim 1, wherein the attributes information includes a time at which the image data is stored in said storage areas, and a predetermined period stored in each of said storage areas.

3.     An image storing apparatus according to Claim 1, further comprising image forming means for forming an image on a sheet based on the image data stored by said storing means, wherein the attributes information includes a time at which the image data stored in said storage areas was formed by said image forming means, and a predetermined period stored in each of said storage areas.

4.     An image storing apparatus according to Claim 1, further comprising erasing means for automatically erasing the image data converted by said converting means based on the attributes information of the image data.

5.     An image storing apparatus according to Claim 1, wherein said converting means converts a resolution of the image data of said storage areas.

6.     An image storing apparatus according to Claim 1, wherein said converting means converts a number of bits per pixel of the image data of said storage areas.

7.     An image storing apparatus according to Claim 1, wherein said converting means converts a number of colors of the image data of said storage areas.

8.     An image storing apparatus according to Claim 1, wherein said converting means reduces by one or more degrees the image quality of the image data of said storage areas and erases the image data in the event that the image quality of the image data is equal to or less than a certain image quality.

UNITED STATES PATENT AND TRADEMARK OFFICE
CERTIFICATE OF CORRECTION

PATENT NO. : 6,476,933 B1
DATED : November 5, 2002
INVENTOR(S) : Masayuki Honma

It is certified that error appears in the above-identified patent and that said Letters Patent is hereby corrected as shown below:

Column 17, line 23 - Column 22, line 37 (cont'd),

9. An image storing apparatus according to Claim 1, further comprising setting means for setting the attributes information of the image data of said storage areas.

10. An image storing apparatus comprising:

storing means having a plurality of storage areas, for storing image data output from an external apparatus;

converting means for converting the image quality of the image data stored in each of said storage areas, according to attributes information of the image data stored in each of said storage areas, image forming means for forming an image on a sheet based on the image data stored in said storing means; and counting means for counting a number of times that the image data stored in each of said storage areas has been formed by said image forming means within a predetermined period stored in each of said storage areas, wherein said attributes information comprises the number of times counted by said counting means.

11. An image storing apparatus comprising:

storing means including a plurality of storage areas, for storing image data output from an external apparatus; and converting means for converting an image quality of the image data stored in said storage areas according to an amount of the image data reaching a predetermined value stored said storage areas, wherein a converted data converted from the image quality of the image data of said storage areas by said converting means is stored in said storage areas instead of the image data.

12. A computer-readable storage medium storing a program to be executed by a computer, said program comprising the steps of:

storing image data output from an external apparatus to a plurality of storage areas; and converting an image quality of the image data of said storage areas, according to attributes information of the image data of said storage areas; and

UNITED STATES PATENT AND TRADEMARK OFFICE
CERTIFICATE OF CORRECTION

PATENT NO. : 6,476,933 B1
DATED : November 5, 2002
INVENTOR(S) : Masayuki Honma

It is certified that error appears in the above-identified patent and that said Letters Patent is hereby corrected as shown below:

Column 17, line 23 - Column 22, line 37 (cont'd), storing a converted data which is converted from the image quality of the image data of said storage areas in the storage areas instead of the image data.

13. A computer-readable storage medium storing a program to be executed by a computer said program comprising the steps of:

storing image data output from an external apparatus to a plurality of storage areas; and converting an image quality of the image data of said storage areas, according to an amount of the image data reaching a predetermined value stored in said storage areas; and storing a converted data which is converted from the image quality of the image data of the storage areas in the storage areas instead of the image data.

14. An image data processing method, comprising the steps of:

storing image data output from an external apparatus to a plurality of storage areas; and converting an image quality of the image data of said storage areas, according to attributes information of the image data of said storage areas; and storing a converted data which is converted from the image quality of the image data of the storage areas in the storage areas instead of the image data.

15. An image data processing method, comprising the steps of:

storing image data output from an external apparatus to a plurality of storage areas;

·converting an image quality of the image data of said storage areas, according to an amount of the image data reaching a predetermined value stored in the storage areas; and storing a converted data which is converted from the image quality of the image data of the storage areas in the storage areas instead of the image data.

16. An image storing apparatus comprising:

storing means including a plurality of storage areas, for storing image data output from an external device; and

UNITED STATES PATENT AND TRADEMARK OFFICE
CERTIFICATE OF CORRECTION

PATENT NO. : 6,476,933 B1
DATED : November 5, 2002
INVENTOR(S) : Masayuki Honma

It is certified that error appears in the above-identified patent and that said Letters Patent is hereby corrected as shown below:

<u>Column 17, line 23 - Column 22, line 37 (cont'd),</u> converting means for converting an image quality of the image data of said storage areas, after a predetermined time period measured from a time that the image data of said storage areas is stored in said storage areas elapses, wherein a converted data which is converted from the image quality of the image data of said storage areas by said converting means is stored in the storage areas instead of the image data.

17. An image storing apparatus according to Claim 16, further comprising setting means for setting the predetermined time period for said storage areas.

18. An image storing apparatus comprising:

storing means including a plurality of storage areas, for storing image data output from an external apparatus;

image forming means for forming an image on a sheet based on the image data stored in said storing means; and control means for executing a control so as to convert an image quality of the image data of said storage areas, after a predetermined time period from a time that the image data is formed by said image forming means elapses and for executing control so as to store the converted data which is converted from the image quality of the image data of the storage areas in the storage area instead of the image data.

19. An image storing apparatus according to Claim 18, further comprising setting means for setting the predetermined time period for each of said storage areas.

20. An image storing apparatus, comprising:

storing means having a plurality of storage areas, for storing image data output from an external apparatus;

image forming means for forming an image on a sheet based on the image data stored by said storing means;

counting means for counting a number of times that the image data stored in each of said storage areas has been formed by said image forming means within a predetermined period; and control means for executing a control so as to convert the image quality of the image data stored in each of said storage areas, according to the number of times counted by said counting means.

UNITED STATES PATENT AND TRADEMARK OFFICE
CERTIFICATE OF CORRECTION

PATENT NO. : 6,476,933 B1
DATED : November 5, 2002
INVENTOR(S) : Masayuki Honma

It is certified that error appears in the above-identified patent and that said Letters Patent is hereby corrected as shown below:

Column 17, line 23 - Column 22, line 37 (cont'd),

21. An image storing apparatus according to Claim 20, wherein said control means compares a predetermined number of times with the number of times counted by said counting means, and in the event that the number of times counted by said counting means is equal to or less than said predetermined number of times, said control means executes a control so as to convert the image quality of the image data stored in each of said storage areas, said control means further comprising:

setting means for setting the predetermined period for each of said storage areas, and said predetermined number of times for each of said storage areas.

22. An image storing method comprising the steps of:

storing image data output from an external device in a storing unit including a plurality of storage areas;

converting an image quality of the image data of the storage areas, after a predetermined time period measured from a time that the image data is stored in the storage areas elapses; and storing a converted data, which is converted from the image quality of the image data of the storage areas, in the storage areas instead of the image data.

23. A computer-readable storage medium storing a program to be executed by a computer, said program comprising the steps of:

storing image data output from an external device in a storing unit including a plurality of storage areas;

converting an image quality of the image data of the storage areas, after a predetermined time period measured from a time that the image data is stored in the storage areas elapses; and storing a converted data, which is converted from the image quality of the image data of the storage areas, in the storage areas instead of the image data.

24. An image storing method, comprising the steps of:

storing image data output from an external apparatus in storing means including a plurality of storage areas;

forming an image by image forming means on a sheet based on the image data of said storing means; and

UNITED STATES PATENT AND TRADEMARK OFFICE
CERTIFICATE OF CORRECTION

| | |
|---|---|
| PATENT NO. | : 6,476,933 B1 |
| DATED | : November 5, 2002 |
| INVENTOR(S) | : Masayuki Honma |

It is certified that error appears in the above-identified patent and that said Letters Patent is hereby corrected as shown below:

Column 17, line 23 - Column 22, line 37 (cont'd), executing a control so as to convert an image quality of the image data of said storage areas, after a predetermined time period measured from a time that the image data is formed by the image forming means elapses and to store converted data, which is converted from the image quality of the image data of the storage areas, in the storage areas instead of the image data.

25. A computer-readable storage medium storing a program to be executed by a computer, said program comprising the steps of:

storing image data output from an external apparatus to storing means including a plurality of storage areas;

forming an image by an image forming means on a sheet based on the image data of said storing areas; and executing a control so as to convert an image quality of the image data of said storage areas, after a predetermined time period from a time that the image data is formed by the image forming means elapses and to store a converted data, which is converted from the image quality of the image data of said storage areas, in the storage areas instead of the image data.

26. An image storing method, comprising the steps of:

storing image data output from an external apparatus in storing means having a plurality of storage areas;

converting the image quality of the image data stored in each of said storage areas, according to attributes information of the image data stored in each of said storage areas, forming an image on a sheet based on the image data stored in said storing means; and counting a number of times that the image data stored in each of said storage areas has been formed by said image forming means within a predetermined period stored in each of said storage areas, the attributes information including the number of times counted by said counting means.

27. A computer-readable storage medium storing a program to be executed by a computer, said program comprising:

a step of storing image data output from an external apparatus in storing means having a plurality of storage areas;

a step of converting the image quality of the image data stored in each of said storage areas, according to attributes information of the image data stored in each of said storage areas,

UNITED STATES PATENT AND TRADEMARK OFFICE
CERTIFICATE OF CORRECTION

| | |
|---|---|
| PATENT NO. | : 6,476,933 B1 |
| DATED | : November 5, 2002 |
| INVENTOR(S) | : Masayuki Honma |

It is certified that error appears in the above-identified patent and that said Letters Patent is hereby corrected as shown below:

Column 17, line 23 - Column 22, line 37 (cont'd), a step of forming an image on a sheet based on the image data stored in said storing means; and a step of counting a number of times that the image data stored in each of said storage areas has been formed by said image forming means within a predetermined period stored in each of said storage areas, the attributes information including the number of times counted by said counting means.

28. A control method for an image storing apparatus which includes a storing means including a plurality of storage areas for storing input image data and image forming means for forming an image on a sheet based on a data of the storage areas, said method comprising the steps of:

controlling a converter so as to convert the image data stored in said storage areas, according to attributes information of the image data of said storage areas; and controlling said storing means so as to store a converted data, which is converted from the image data by the converter, in the storage areas instead of the image data.

29. A method according to Claim 28, further comprising a step of automatically erasing the converted data stored in the storage areas based on the attributes information of the image data.

30. A method according to Claim 28, wherein said converter converts a resolution of the image data.

31. A method according to Claim 28, wherein said converter converts a number of bits per pixel of the image data.

32. A method according to Claim 28, wherein said converter converts a number of colors of image data.

33. A method according to Claim 28, further comprising step of setting said attributes information of the image data in each of said storage means.

UNITED STATES PATENT AND TRADEMARK OFFICE
CERTIFICATE OF CORRECTION

| | |
|---|---|
| PATENT NO. | : 6,476,933 B1 |
| DATED | : November 5, 2002 |
| INVENTOR(S) | : Masayuki Honma |

It is certified that error appears in the above-identified patent and that said Letters Patent is hereby corrected as shown below:

Column 17, line 23 - Column 22, line 37 (cont'd),

34.    A method according to Claim 28, wherein said image data is input from an external apparatus.

35.    A control method for an image storing apparatus, which includes a storing means including a plurality of storage areas for storing input image data and an image forming means for forming an image on a sheet based on a data stored in said storage areas, said method comprising the steps of:

controlling a converter so as to convert the image data stored in said storage areas, according to attributes information of the image data stored in said storage areas; and controlling said storing means so as to store a converted data from the converter in the storage areas instead of the image data, wherein said attributes information includes a time at which the image data was stored in said storage areas and a predetermined period.

36.    A control method for an image storing apparatus, which includes a storing means including a plurality of storage areas for storing input image data and an image forming means for forming an image on a sheet based on a data stored in said storage areas, said method comprising the steps of:

controlling a converter so as to convert the image data stored in said storage areas, according to attributes information of the image data stored in said storage areas; and controlling said storing means so as to store a converted data from the converter in the storage areas instead of the image data, wherein said attributes information includes a time at which the image data stored in said storage areas was formed by said image forming means and a predetermined period.

37.    A control method for an image storing apparatus, which includes a storing means including a plurality of storage areas for storing input image data and an image forming means for forming an image on a sheet based on a data stored in said storage areas, said method comprising the steps of:

controlling a converter so as to convert the image data stored in said storage areas, according to attributes information of the image data stored in said storage areas; and controlling said storing means so as to store a converted data from the converter in the storage areas instead of the image data, wherein said attributes information includes a number of times that the image data stored in said storage areas has been formed by said image forming means within a predetermined period.

UNITED STATES PATENT AND TRADEMARK OFFICE
CERTIFICATE OF CORRECTION

PATENT NO. : 6,476,933 B1
DATED : November 5, 2002
INVENTOR(S) : Masayuki Honma

It is certified that error appears in the above-identified patent and that said Letters Patent is hereby corrected as shown below:

<u>Column 17, line 23 - Column 22, line 37 (cont'd),</u>

38.    In an image storing apparatus which includes a storing means including a plurality of storage areas for storing input image data and image forming means for forming an image on a sheet based on a data of said storage means, a computer-readable storage medium storing a program to be executed by a computer, said program comprising the steps of:

controlling a converter so as to convert the image data of said storage areas, according to attributes information of the image data of said storage areas; and controlling the storing means so as to store a converted data, which is converted from the image data of said storage areas by said converter, in the storage areas instead of the image data.

39.    A control method for an image storing apparatus which includes a storing means including a plurality of storage areas for storing input image data and image forming means for forming an image on a sheet based on a data of said storage areas, said method comprising the steps of:

controlling a converter so as to convert the image data of said storage areas, according to a total amount of the image data stored by the storing means; and controlling the storing means so as to store a converted data, which is converted from the image data of said storage areas by said converter, in the storage areas instead of the image data.

UNITED STATES PATENT AND TRADEMARK OFFICE
CERTIFICATE OF CORRECTION

PATENT NO. : 6,476,933 B1
DATED : November 5, 2002
INVENTOR(S) : Masayuki Honma

It is certified that error appears in the above-identified patent and that said Letters Patent is hereby corrected as shown below:

Column 17, line 23 - Column 22, line 37 (cont'd),

40. In an image storing apparatus which includes storing means including a plurality of storage areas for storing input image data and image forming means for forming an image on a sheet based on a data of said storage areas, a computer-readable storage medium storing a program to be executed by a computer, said program comprising the steps of:

controlling a converter so as to convert the image data of said storage areas, according to a total amount of the image data stored by the storing means; and controlling the storing means so as to store a converted data, which is converted from the image data of said storage areas by the converter, in the storage areas instead of the image data.--

Signed and Sealed this

Twenty-sixth Day of July, 2005

JON W. DUDAS
*Director of the United States Patent and Trademark Office*